United States Patent
Schweizer et al.

(10) Patent No.: US 12,553,984 B2
(45) Date of Patent: Feb. 17, 2026

(54) DEVICE POSITIONING WITH RECONFIGURABLE INTELLIGENT SURFACES

(71) Applicant: Apple Inc., Cupertino, CA (US)

(72) Inventors: Benedikt Schweizer, Munich (DE); Danila Zaev, Munich (DE); Firouz Behnamfar, Los Gatos, CA (US); Ayman F Naguib, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 369 days.

(21) Appl. No.: 18/184,566

(22) Filed: Mar. 15, 2023

(65) Prior Publication Data

US 2024/0310470 A1  Sep. 19, 2024

(51) Int. Cl.
*G01S 5/02* (2010.01)

(52) U.S. Cl.
CPC .................................. *G01S 5/0273* (2013.01)

(58) Field of Classification Search
CPC .. H04B 7/04013; H04B 7/145; H04B 7/0617; H04B 7/15528; H04B 7/06; H04B 7/15557; H04B 17/345; G01S 5/0273; G01S 5/0063; H04W 64/00; H04W 72/04; H04W 24/04; H04W 72/231; H04W 12/06; H04L 2209/80

See application file for complete search history.

(56) References Cited

U.S. PATENT DOCUMENTS

| | | | | |
|---|---|---|---|---|
| 2019/0020401 | A1* | 1/2019 | Gharavi | H04B 17/318 |
| 2021/0302561 | A1* | 9/2021 | Bayesteh | G01S 13/42 |
| 2021/0384958 | A1* | 12/2021 | Denis | H04B 7/145 |

(Continued)

FOREIGN PATENT DOCUMENTS

| | | | | |
|---|---|---|---|---|
| WO | WO-2021221603 A1 | * | 11/2021 | G01S 5/0036 |
| WO | WO-2022051882 A1 | * | 3/2022 | G01S 13/751 |

OTHER PUBLICATIONS

L. Zhang et al., Space-Time-Coding Digital Metasurfaces, 13th International Congress on Artificial Materials for Novel Wave Phenomena—Metamaterials 2019, Rome, Italy, Sep. 16-Sep. 21, 2019, pp. 128-130, IEEE, New York, NY, United States.

(Continued)

*Primary Examiner* — Olumide Ajibade Akonai
(74) *Attorney, Agent, or Firm* — Treyz Law Group, P.C.; Michael H. Lyons

(57) ABSTRACT

A communication system may include a transmitting (TX) device, a receiving (RX) device, and a one or more reconfigurable intelligent surfaces (RIS's). The TX device may transmit a wireless signal received by the RX device over multiple propagation paths including paths that reflect off the RIS(s) and paths that include other reflections. The RX device may receive location information from each RIS. The RX device or a control device may control each RIS to modulate the wireless signal with a different respective identifier upon reflection of the wireless signal by the RIS. The RX device may distinguish the wireless signal as reflected off the RIS(s) from reflections off other objects based on the RIS identifiers modulated onto the wireless signals by the RIS(s). The RX device may use a multilateration technique to detect its position based on the received location information and the wireless signals as reflected off the RIS(s).

20 Claims, 8 Drawing Sheets

(56) References Cited

U.S. PATENT DOCUMENTS

| | | |
|---|---|---|
| 2023/0013335 A1 | 1/2023 | Ellenbeck et al. |
| 2023/0058998 A1 | 2/2023 | Gunzelmann et al. |
| 2023/0258759 A1* | 8/2023 | Wang .................... G01S 1/0423 455/456.1 |
| 2024/0027574 A1* | 1/2024 | Zhuang ................... G01S 13/87 |

OTHER PUBLICATIONS

Xiaoshen Song et al., Fully- / Partially-Connected Hybrid Beamforming Architectures for mmWave MU-MIMO, IEEE Transactions on Wireless Communications, Dec. 2019, pp. 1-16, vol. 19, IEEE, New York, NY, United States.

Cyril C. Renaud et al., Antenna Integrated THz Uni-Traveling Carrier Photodiodes, IEEE Journal of Selected Topics in Quantum Electronics, Mar./Apr. 2018, vol. 24, No. 2, IEEE, New York, NY, United States.

Xilong Pei et al., RIS-Aided Wireless Communications: Prototyping, Adaptive Beamforming, and Indoor/Outdoor Field Trials, IEEE Transactions on Communications, Sep. 2021, pp. 1-13, vol. 69, IEEE, New York, NY, United States.

Michele Natrella et al., Accurate Equivalent Circuit Model for Millimetre-Wave UTC Photodiodes, 2016, pp. 4698-4713, vol. 24, No. 5, Optics Express.

Chhandak Mukherjee et al., Efficient Compact Modelling of UTC-Photodiode Towards Terahertz Communication System Design, Solid-State Electronics, 2020, pp. 1-11, HAL.

C. Mukherjee et al., First Uni-Traveling Carrier Photodiode Compact Model Enabling Future Terahertz Communication System Design, ESSDERC 2019—49th European Solid-State Device Research Conference (ESSDERC), Sep. 23-26, 2019, pp. 150-153, IEEE, New York, NY, United States.

Ming Che et al., Optoelectronic THz-Wave Beam Steering by Arrayed Photomixers With Integrated Antennas, IEEE Photonics Technology Letters, Aug. 15, 2020, pp. 979-982, vol. 32, No. 16, IEEE, New York, NY, United States.

Qingqing Wu et al., Intelligent Reflecting Surface Aided Wireless Communications: A Tutorial, IEEE Transactions on Communications, 2021, pp. 1-39, vol. 69, IEEE, New York, NY, United States.

Kamran Keykhosravi et al., RIS-Enabled Self-Localization: Leveraging Controllable Reflections With Zero Access Points, ICC 2022—IEEE International Conference on Communications, May 16-20, 2022, IEEE, New York, NY, United States.

Kamran Keykhosravi et al., SISO RIS-Enabled Joint 3D Downlink Localization and Synchronization, ICC 2021—IEEE International Conference on Communications, Jun. 14-23, 2021, IEEE, New York, NY, United States.

Kamran Keykhosravi et al., RIS-Enabled SISO Localization under User Mobility and Spatial-Wideband Effects, IEEE Journal of Selected Topics in Signal Processing, May 2022, pp. 1-16, vol. 16, IEEE, New York, NY, United States.

Kamran Keykhosravi et al., Multi-RIS Discrete-Phase Encoding for Interpath-Interference-Free Channel Estimation, 2016, pp. 1-5.

U.S. Appl. No. 18/160,245, filed Jan. 26, 2023.
U.S. Appl. No. 18/069,875, filed Dec. 21, 2022.
U.S. Appl. No. 18/181,130, filed Mar. 9, 2023.

\* cited by examiner

DEVICE POSITIONING WITH RECONFIGURABLE INTELLIGENT SURFACES

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. As the frequency of the radio-frequency signals increases, it can become increasingly difficult to perform satisfactory wireless communications because the signals become subject to significant over-the-air attenuation and typically require line-of-sight. In addition, it can sometimes be desirable to be able to detect the position of the electronic device using the radio-frequency signals.

SUMMARY

A communication system may include a transmitting (TX) device, a receiving (RX) device, and a set of one or more reconfigurable intelligent surfaces (RIS's). The TX device may be a wireless base station or user equipment (UE) device, as examples. The RX device may be a UE device or a wireless base station, as examples. The TX device and the RX device may be the same device if desired (e.g., a UE device). Each RIS may have an array of antenna elements and adjustable devices such as phase shifters coupled to the array of antenna elements.

The TX device may transmit a wireless signal into the environment. The RX device may receive the wireless signal over multiple propagation paths. The propagation paths may include a line of sight propagation path, propagation paths that include reflection off the RIS(s) in the system, and/or propagation paths that include reflections off other objects in the environment. The RX device may receive location information and capability information from each of the RIS's (e.g., over a different radio access technology than is used to convey the wireless signal). The RX device or a different control device may use the capability information to control the RIS's to modulate the wireless signal with a different respective RIS identifier upon reflection of the wireless signal by the RIS's. Each RIS may modulate the wireless signal by controlling its adjustable devices to adjust the phase shifts of the complex reflection coefficients of each of its antenna elements over time and/or space.

The RX device may distinguish the wireless signal as reflected off the RIS(s) from the wireless signals as reflected off other objects based on the RIS identifiers modulated onto the wireless signals upon reflection by the RIS(s). The wireless signal as reflected off other objects are not modulated upon reflection. The RX device may detect its relative and/or absolute position using a multilateration technique based on the received wireless signals as reflected off the RIS(s) and the received location information. In implementations where the TX device and the RX device are separate devices (e.g., in a bistatic inter-device positioning implementation), one of the devices may be stationary or may have precise knowledge of its position. In implementations where the TX device and the RX device are the same device (e.g., in a monostatic self-localization implementation), reflections of the wireless signal off multiple RIS's may be used to pinpoint the location of the RX device. The RX device may also use angle-of-arrival of the wireless signals to help identify its position. Detecting position in this way may allow the RX device to eliminate synchronization errors associated with detecting position using wireless signals conveyed between two devices. This may further allow the RX device to detect its position with high accuracy. The RX device may use its detected position to perform any desired operations such as beamforming or beam tracking.

An aspect of the disclosure provides a method of operating an electronic device. The method can include receiving, at one or more antennas, a wireless signal reflected by a reconfigurable intelligent surface (RIS), the wireless signal being modulated using an identifier upon reflection by the RIS. The method can include detecting, at one or more processors, a location of the electronic device based on the wireless signal reflected by the RIS.

An aspect of the disclosure provides an electronic device. The electronic device can include an array of antennas configured to receive a wireless signal over multiple propagation paths. The electronic device can include one or more processors communicably coupled to the array of antennas. The one or more processors can be configured to distinguish, based on information modulated onto the wireless signal by a reconfigurable intelligent surface (RIS), the wireless signal as received over a propagation path that includes a reflection off the RIS from the wireless signal as received over other propagation paths of the multiple propagation paths. The one or more processors can be configured to detect, based on the wireless signal as received over the propagation path that includes the reflection off the RIS, a position of the electronic device.

An aspect of the disclosure provides a method of operating a reconfigurable intelligent surface (RIS). The method can include reflecting, at an array of antenna elements, a wireless signal incident upon the RIS. The method can include modulating, using adjustable devices coupled to the array of antenna elements, an identifier of the RIS onto the wireless signal upon reflection of the wireless signal by the array of antenna elements.

DETAILED DESCRIPTION

Figure 1:
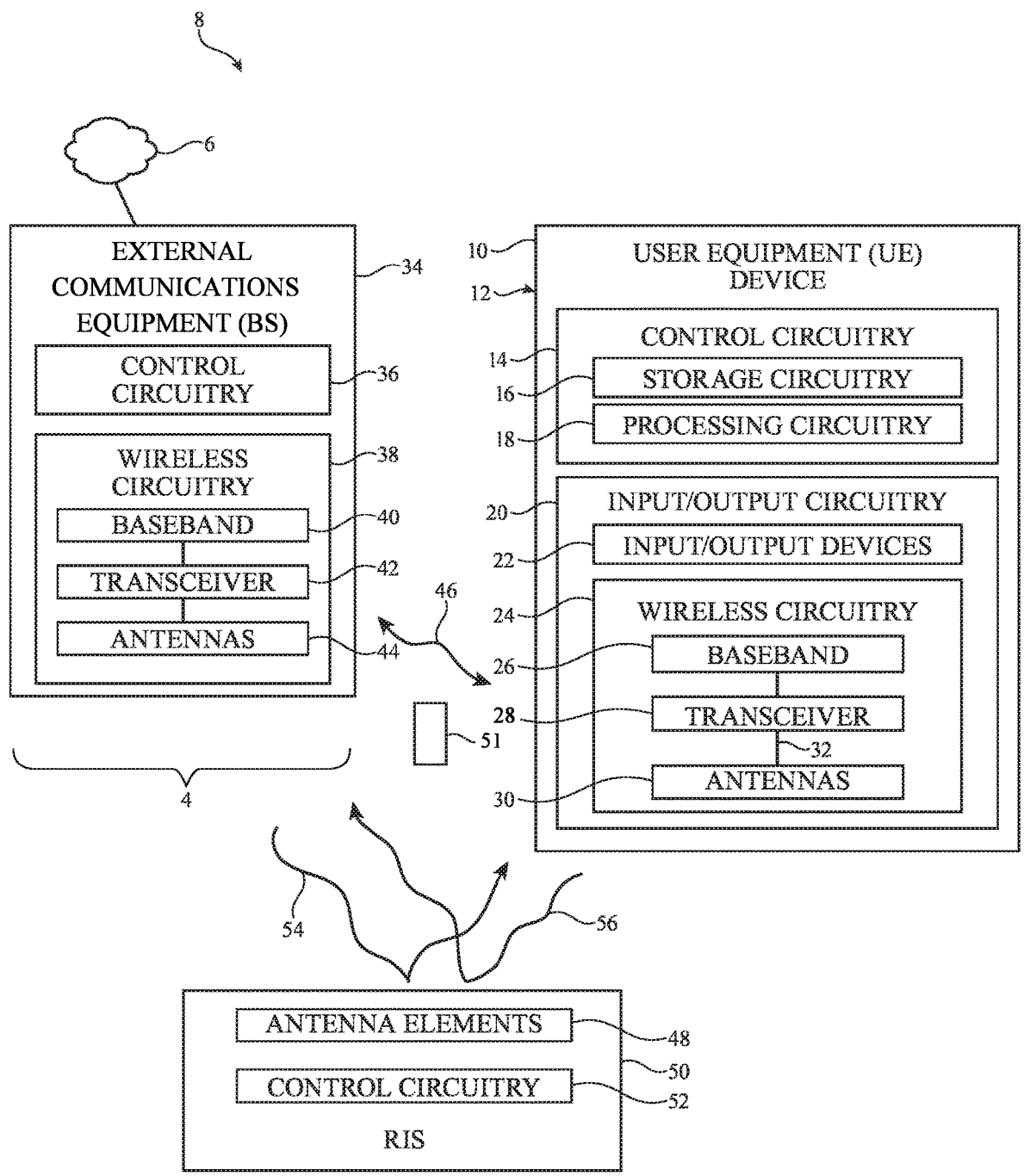
FIG. 1 is a schematic block diagram of an illustrative communications system having a user equipment (UE) device, external communications equipment, and a reconfigurable intelligent surface (RIS) in accordance with some embodiments.

FIG. 1 is a schematic diagram of an illustrative communications system 8 (sometimes referred to herein as communications network 8) for conveying wireless data between communications terminals. Communications system 8 may include network nodes (e.g., communications terminals). The network nodes may include user equipment (UE) such as one or more UE devices 10 (sometimes referred to herein simply as UE 10). The network nodes may also include external communications equipment (e.g., communications equipment other than UE devices 10) such as external communications equipment 34. External communications equipment 34 (sometimes referred to herein simply as external equipment 34) may include one or more electronic devices and may be a wireless base station, wireless access point (AP), or other wireless equipment for example. An implementation in which external communications equipment 34 forms a wireless base station (BS) is described herein as an example. External communications equipment 34 may therefore sometimes be referred to herein as BS 34. UE device 10 and BS 34 may communicate with each other using one or more wireless communications links. If desired, UE devices 10 may wirelessly communicate with BS 34 without passing communications through any other intervening network nodes in communications system 8 (e.g., UE devices 10 may communicate directly with BS 34 over-the-air).

BS 34 may be communicably coupled to one or more other network nodes 6 in a larger communications network 4 via wired and/or wireless links. Network 4 may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. Network 4 may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE devices 10 may send data to and/or may receive data from other nodes or terminals in network 4 via BS 34 (e.g., BS 34 may serve as an interface between user equipment devices 10 and the rest of the larger communications network). Network 4 may be managed, operated, controlled, or run by a corresponding network service provider (e.g., a cellular network carrier).

User equipment (UE) device 10 of FIG. 1 is an electronic device (sometimes referred to herein as electronic device 10 or device 10) and may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, equipment that implements the functionality of two or more of these devices, or other electronic equipment.

As shown in the functional block diagram of FIG. 1, UE device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

UE device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors such as microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

UE device 10 may include input-output circuitry 20. Input-output circuitry 20 may include input-output devices 22. Input-output devices 22 may be used to allow data to be supplied to UE device 10 and to allow data to be provided from UE device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 22 may be peripherals that are coupled to a main processing unit or other portion of UE device 10 via a wired or wireless link).

Input-output circuitry 20 may include wireless circuitry 24 to support wireless communications. Wireless circuitry 24 (sometimes referred to herein as wireless communications circuitry 24) may include baseband circuitry such as baseband circuitry 26 (e.g., one or more baseband processors and/or other circuitry that operates at baseband), radio-frequency (RF) transceiver circuitry such as transceiver 28, and one or more antennas 30. If desired, wireless circuitry 24 may include multiple antennas 30 that are arranged into a phased antenna array (sometimes referred to as a phased array antenna) that conveys radio-frequency signals within a corresponding signal beam that can be steered in different directions. Baseband circuitry 26 may be coupled to transceiver 28 over one or more baseband data paths. Transceiver 28 may be coupled to antennas 30 over one or more radio-frequency transmission line paths 32. If desired, radio-frequency front end circuitry may be disposed on radio-frequency transmission line path(s) 32 between transceiver 28 and antennas 30.

In the example of FIG. 1, wireless circuitry 24 is illustrated as including only a single transceiver 28 and a single radio-frequency transmission line path 32 for the sake of clarity. In general, wireless circuitry 24 may include any desired number of transceivers 28, any desired number of radio-frequency transmission line paths 32, and any desired number of antennas 30. Each transceiver 28 may be coupled to one or more antennas 30 over respective radio-frequency transmission line paths 32. Radio-frequency transmission line path 32 may be coupled to antenna feeds on one or more antenna 30. Each antenna feed may, for example, include a positive antenna feed terminal and a ground antenna feed terminal. Radio-frequency transmission line path 32 may have a positive transmission line signal path that is coupled to the positive antenna feed terminal and may have a ground transmission line signal path that is coupled to the ground antenna feed terminal. This example is merely illustrative and, in general, antennas 30 may be fed using any desired antenna feeding scheme.

Radio-frequency transmission line path 32 may include transmission lines that are used to route radio-frequency antenna signals within device 10. Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 32 may be integrated into rigid and/or flexible printed circuit boards. In one embodiment, radio-frequency transmission line paths such as radio-frequency transmission line path 32 may also include transmission line conductors integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

In performing wireless transmission (e.g., in an uplink (UL) direction from UE device 10 to BS 34), baseband circuitry 26 may provide baseband signals to transceiver 28 (e.g., baseband signals that include wireless data for transmission). Transceiver 28 may include circuitry for converting the baseband signals received from baseband circuitry 26 into corresponding radio-frequency signals (e.g., for modulating the wireless data onto one or more carriers for transmission, synthesizing a transmit signal, etc.). For example, transceiver 28 may include mixer circuitry for up-converting the baseband signals to radio frequencies prior to transmission over antennas 30. Transceiver 28 may also include digital to analog converter (DAC) and/or analog to digital converter (ADC) circuitry for converting signals between digital and analog domains. Transceiver 28 may transmit the radio-frequency signals over antennas 30 via radio-frequency transmission line path 32. Antennas 30 may transmit the radio-frequency signals to external wireless equipment by radiating the radio-frequency signals into free space.

In performing wireless reception (e.g., in a downlink (DL) direction from BS 34 to UE device 10), antennas 30 may receive radio-frequency signals from BS 34. The received radio-frequency signals may be conveyed to transceiver 28 via radio-frequency transmission line path 32. Transceiver 28 may include circuitry for converting the received radio-frequency signals into corresponding baseband signals. For example, transceiver 28 may include mixer circuitry for down-converting the received radio-frequency signals to baseband frequencies prior to conveying the baseband signals to baseband circuitry 26 and may include demodulation circuitry for demodulating wireless data from the received signals.

Front end circuitry disposed on radio-frequency transmission line path 32 may include radio-frequency front end components that operate on radio-frequency signals conveyed over radio-frequency transmission line path 32. If desired, the radio-frequency front end components may be formed within one or more radio-frequency front end modules (FEMs). Each FEM may include a common substrate such as a printed circuit board substrate for each of the radio-frequency front end components in the FEM. The radio-frequency front end components in the front end circuitry may include switching circuitry (e.g., one or more radio-frequency switches), radio-frequency filter circuitry (e.g., low pass filters, high pass filters, notch filters, band pass filters, multiplexing circuitry, duplexer circuitry, diplexer circuitry, triplexer circuitry, etc.), impedance matching circuitry (e.g., circuitry that helps to match the impedance of antennas 30 to the impedance of radio-frequency transmission line path 32), antenna tuning circuitry (e.g., networks of capacitors, resistors, inductors, and/or switches that adjust the frequency response of antennas 30), radio-frequency amplifier circuitry (e.g., power amplifier circuitry and/or low-noise amplifier circuitry), radio-frequency coupler circuitry, charge pump circuitry, power management circuitry, digital control and interface circuitry, and/or any other desired circuitry that operates on the radio-frequency signals transmitted and/or received by antennas 30.

While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, baseband circuitry 26 and/or portions of transceiver 28 (e.g., a host processor on transceiver 28) may form a part of control circuitry 14. Baseband circuitry 26 may, for example, access a communication protocol stack on control circuitry 14 (e.g., storage circuitry 16) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between device 10 and BS 34 (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless (radio-frequency) sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc. The sensing operations may, for example, involve the transmission of sensing signals (e.g., radar waveforms), the receipt of corresponding reflected signals (e.g., the transmitted waveforms that have reflected off of external objects), and the processing of the transmitted signals and the received reflected signals (e.g., using a radar scheme).

Wireless circuitry 24 may transmit and/or receive wireless signals within corresponding frequency bands of the electromagnetic spectrum (sometimes referred to herein as communications bands or simply as "bands"). The frequency bands handled by wireless circuitry 24 may include wireless local area network (WLAN) frequency bands (e.g., Wi-Fi® (IEEE 802.11) or other WLAN communications bands) such as a 2.4 GHZ WLAN band (e.g., from 2400 to 2480 MHz), a 5 GHZ WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, 6G bands at sub-THz or THz frequencies greater than about 100 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-100 Gbps or higher, wireless circuitry 24 may convey wireless signals at frequencies greater than about 100 GHz.

As shown in FIG. 1, wireless circuitry 24 may transmit wireless signals 46 to BS 34 and/or may receive wireless signals 46 from BS 34. Wireless signals 46 may be tremendously high frequency (THF) signals (e.g., sub-THz or THz signals) at frequencies greater than around 100 GHz (e.g., between 100 GHz and 1 THz, between 80 GHz and 10 THz, between 100 GHz and 10 THz, between 100 GHz and 2 THz, between 200 GHz and 1 THz, between 300 GHz and 1 THz, between 300 GHz and 2 THz, between 70 GHz and 2 THz, between 300 GHz and 10 THz, between 100 GHz and 800 GHz, between 200 GHz and 1.5 THz, or within any desired sub-THz, THz, THF, or sub-millimeter frequency band such as a 6G frequency band), may be millimeter (mm) or centimeter (cm) wave signals between 10 GHz and around 70 GHZ (e.g., 5G NR FR2 signals), or may be signals at frequencies less than 10 GHz (e.g., 5G NR FR1 signals, LTE signals, 3G signals, 2G signals, WLAN signals, Bluetooth signals, UWB signals, etc.).

If desired, the high data rates supported by THE signals may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals 32 to another antenna 30 on a second chip in device 10), and/or to perform any other desired high data rate operations.

In implementations where wireless circuitry 24 conveys THF signals, the wireless circuitry may include electro-optical circuitry if desired. The electro-optical circuitry may include light sources that generate first and second optical local oscillator (LO) signals. The first and second optical LO signals may be separated in frequency by the intended frequency of wireless signals 46. Wireless data may be modulated onto the first optical LO signal and one of the optical LO signals may be provided with an optical phase shift (e.g., to perform beamforming). The first and second optical LO signals may illuminate a photodiode that produces current at the frequency of wireless signals 46 when illuminated by the first and second optical LO signals. An antenna resonating element of a corresponding antenna 30 may convey the current produced by the photodiode and may radiate corresponding wireless signals 46. This is merely illustrative and, in general, wireless circuitry 24 may generate wireless signals 46 using any desired techniques.

Antennas 30 may be formed using any desired antenna structures. For example, antennas 30 may include antennas with resonating elements that are formed from loop antenna structures, patch antenna structures, inverted-F antenna structures, slot antenna structures, planar inverted-F antenna structures, helical antenna structures, monopole antennas, dipoles (e.g., planar dipole antennas such as bowtie antennas), hybrids of these designs, etc. Parasitic elements may be included in antennas 30 to adjust antenna performance.

If desired, two or more of antennas 30 may be integrated into a phased antenna array (sometimes referred to herein as a phased array antenna or an array of antenna elements). Each antenna 30 in the phased antenna array forms a respective antenna element of the phased antenna array. Each antenna 30 in the phased antenna array has a respective phase and magnitude controller that imparts the radio-frequency signals conveyed by that antenna with a respective phase and magnitude. The respective phases and magnitudes may be selected (e.g., by control circuitry 14) to configure the radio-frequency signals conveyed by the antennas 30 in the phased antenna array to constructively and destructively interfere in such a way that the radio-frequency signals collectively form a signal beam (e.g., a signal beam of wireless signals 46) oriented in a corresponding beam pointing direction (e.g., a direction of peak gain).

The control circuitry may adjust the phases and magnitudes to change (steer) the orientation of the signal beam (e.g., the beam pointing direction) to point in other directions over time. This process may sometimes also be referred to herein as beamforming. Beamforming may boost the gain of wireless signals 46 to help overcome over-the-air attenuation and the signal beam may be steered over time to point towards BS 34 even as the position and orientation of UE device 10 changes. The signal beams formed by antennas 30 of UE device 10 may sometimes be referred to herein as UE beams or UE signal beams. Each UE beam may be oriented in a different respective direction (e.g., a beam pointing direction of peak signal gain). Each UE beam may be labeled by a corresponding UE beam index. UE device 10 may include or store a codebook (sometimes referred to herein as a UE codebook) that maps each of its UE beam indices to the corresponding phase and magnitude settings for each antenna 30 in a phased antenna array that configure the phased antenna array to form the UE beam associated with that UE beam index.

As shown in FIG. 1, BS 34 may also include control circuitry 36 (e.g., control circuitry having similar components and/or functionality as control circuitry 14 in UE device 10) and wireless circuitry 38 (e.g., wireless circuitry having similar components and/or functionality as wireless circuitry 24 in UE device 10). Wireless circuitry 38 may include baseband circuitry 40 and transceiver 42 (e.g., transceiver circuitry having similar components and/or functionality as transceiver circuitry 28 in UE device 10) coupled to two or more antennas 44 (e.g., antennas having similar components and/or functionality as antennas 30 in UE device 10). Antennas 44 may be arranged in one or more phased antenna arrays (e.g., phased antenna arrays that perform beamforming similar to phased antenna arrays of antennas 30 on UE device 10).

BS 34 may use wireless circuitry 38 to transmit a signal beam of wireless signals 46 to UE device 10 (e.g., as DL signals transmitted in a DL direction) and/or to receive a signal beam of wireless signals 46 transmitted by UE device 10 (e.g., as UL signals transmitted in a UL direction). The signal beams formed by antennas 44 of BS 34 may sometimes be referred to herein as BS beams or BS signal beams. Each BS beam may be oriented in a different respective direction (e.g., a beam pointing direction of peak signal gain). Each BS beam may be labeled by a corresponding BS beam index. BS 34 may include or store a codebook (sometimes referred to herein as a BS codebook) that maps each of its BS beam indices to the corresponding phase and magnitude settings for each antenna 44 in a phased antenna array that configure the phased antenna array to form the BS beam associated with that BS beam index.

While communications at high frequencies allow for extremely high data rates (e.g., greater than 100 Gbps), wireless signals 46 at such high frequencies are subject to significant attenuation during propagation over-the-air. Integrating antennas 30 and 44 into phased antenna arrays helps to counteract this attenuation by boosting the gain of the signals within a signal beam. However, signal beams are highly directive and may require a line-of-sight (LOS) between UE device 10 and BS 34. If an external object is present between BS 34 and UE device 10, the external object may block the LOS between UE device 10 and BS 34, which can disrupt wireless communications using wireless signals 46. If desired, a reflective device such as a reconfigurable intelligent surface (RIS) may be used to allow UE device 10 and BS 34 to continue to communicate using wireless signals 46 even when an external object blocks the LOS between UE device 10 and BS 34 (or whenever direct over-the-air communications between BS 34 and UE device 10 otherwise exhibits less than optimal performance).

As shown in FIG. 1, system 8 may include one or more reconfigurable intelligent surfaces (RIS's) such as RIS 50. RIS 50 may sometimes also be referred to as an intelligent reconfigurable surface, an intelligent reflective/reflecting surface, a reflective intelligent surface, a reflective surface, a reflective device, a reconfigurable reflective device, a reconfigurable reflective surface, or a reconfigurable surface. BS 34 may be separated from UE device 10 by a line-of-sight (LOS) path. In some circumstances, an external object such as object 31 may block the LOS path. Object 31 may be, for example, part of a building such as a wall, window, floor, or ceiling (e.g., when UE device 10 is located inside), furniture, a body or body part, an animal, a cubicle wall, a vehicle, a landscape feature, or other obstacles or objects that may block the LOS path between BS 34 and UE device 10.

In the absence of external object 31, BS 34 may form a corresponding BS beam of wireless signals 46 oriented in the direction of UE device 10 and UE device 10 may form a corresponding UE beam of wireless signals 46 oriented in the direction of BS 34. UE device 10 and BS 34 can then convey wireless signals 46 over their respective signal beams and the LOS path. However, the presence of external object 31 prevents wireless signals 46 from being conveyed over the LOS path.

RIS 50 may be placed or disposed within system 8 in such a way so as to allow RIS 50 to reflect wireless signals 46 between UE device 10 and BS 34 despite the presence of external object 31 within the LOS path. More generally, RIS 50 may be used to reflect wireless signals 46 between UE device 10 and BS 34 when reflection via RIS 50 offers superior radio-frequency propagation conditions relative to the LOS path regardless of the presence of external object 31 (e.g., when the LOS path between BS 34 and RIS 50 and the LOS path between RIS 50 and UE device 10 exhibit superior propagation/channel conditions than the direct LOS path between UE device 10 and BS 34).

When RIS 50 is placed within system 8, BS 34 may transmit wireless signals 46 towards RIS 50 (e.g., within a BS beam oriented towards RIS 50 rather than towards UE device 10) and RIS 50 may reflect the wireless signals towards UE device 10, as shown by arrow 54. Conversely, UE device 10 may transmit wireless signals 46 towards RIS 50 (e.g., within a UE beam oriented towards RIS 50 rather than towards BS 34) and RIS 50 may reflect the wireless signals towards BS 34, as shown by arrow 56.

RIS 50 is an electronic device that includes a two-dimensional surface of engineered material having reconfigurable properties for performing (e.g., reflecting) communications between BS 34 and UE device 10. RIS 50 may include an array of reflective elements such as antenna elements 48 on an underlying substrate. Antenna elements 48 may also sometimes be referred to herein as reflective elements 48, reconfigurable antenna elements 48, reconfigurable reflective elements 48, reflectors 48, or reconfigurable reflectors 48.

The substrate may be a rigid or flexible printed circuit board, a package, a plastic substrate, meta-material, or any other desired substrate. The substrate may be planar or may be curved in one or more dimensions. If desired, the substrate and antenna elements 48 may be enclosed within a housing. The housing may be formed from materials that are transparent to wireless signals 46. If desired, RIS 50 may be disposed (e.g., layered) on an underlying electronic device. RIS 50 may also be provided with mounting structures (e.g., adhesive, brackets, a frame, screws, pins, clips, etc.) that can be used to affix or attach RIS 50 to an underlying structure such as another electronic device, a wall, the ceiling, the floor, furniture, etc. Disposing RIS 50 on a ceiling, wall, window, column, pillar, or at or adjacent to the corner of a room (e.g., a corner where two walls intersect, where a wall intersects with the floor or ceiling, where two walls and the floor intersect, or where two walls and the ceiling intersect), as examples, may be particularly helpful in allowing RIS 50 to reflect wireless signals between BS 34 and UE device 10 around various objects 31 that may be present (e.g., when BS 34 is located outside and UE device 10 is located inside, when BS 34 and UE device 10 are both located inside or outside, etc.).

RIS 50 may be a passive adaptively controlled reflecting surface and a powered device that includes control circuitry 52 that helps to control the operation of antenna elements 48 (e.g., one or more processors in control circuitry such as control circuitry 14). When electro-magnetic (EM) energy waves (e.g., waves of wireless signals 46) are incident on RIS 50, the wave is reflected by each antenna element 48 via re-radiation by each antenna element 48 with a respective phase and amplitude response. Antenna elements 48 may include passive reflectors (e.g., antenna resonating elements or other radio-frequency reflective elements). Each antenna element 48 may include an adjustable device that is programmed, set, and/or controlled by control circuitry 52 (e.g., using a control signal that includes or represents a respective beamforming coefficient) to configure that antenna element 48 to reflect incident EM energy with the respective phase and amplitude response (e.g., with a respective reflection coefficient). The adjustable device may be a programmable photodiode, an adjustable impedance matching circuit, an adjustable phase shifter, an adjustable amplifier, a varactor diode, an antenna tuning circuit, combinations of these, etc.

Control circuitry 52 on RIS 50 may configure the reflective response of antenna elements 48 on a per-element or per-group-of-elements basis (e.g., where each antenna element has a respective programmed phase and amplitude response or the antenna elements in different sets/groups of antenna elements are each programmed to share the same respective phase and amplitude response across the set/group but with different phase and amplitude responses between sets/groups). The scattering, absorption, reflection, and diffraction properties of the entire RIS can therefore be changed over time and controlled (e.g., by software running on the RIS or other devices communicably coupled to the RIS such as BS 34 or UE device 10).

One way of achieving the per-element phase and amplitude response of antenna elements 48 is by adjusting the impedance of antenna elements 48, thereby controlling the complex reflection coefficient that determines the change in amplitude and phase of the re-radiated signal. The control circuitry 52 on RIS 50 may configure antenna elements 48 to exhibit impedances that serve to reflect wireless signals 46 incident from particular incident angles onto particular output angles. The antenna elements 48 (e.g., the antenna impedances) may be adjusted to change the angle with which incident wireless signals 46 are reflected off of RIS 50.

For example, the control circuitry on RIS 50 may configure antenna elements 48 to reflect wireless signals 46 transmitted by BS 34 towards UE device 10 (as shown by arrow 54) and to reflect wireless signals 46 transmitted by UE device 10 towards BS 34 (as shown by arrow 56). In such an example, control circuitry 36 may configure (e.g., program) a phased antenna array of antennas 44 on BS 34 to form a BS beam oriented towards RIS 50, control circuitry 14 may configure (e.g., program) a phased antenna array of antennas 30 on UE device 10 to form a UE beam oriented towards RIS 50, control circuitry 52 may configure (e.g., program) antenna elements 48 to receive and re-radiate (e.g., effectively reflect) wireless signals incident from the direction of BS 34 towards/onto the direction of UE device 10 (as shown by arrow 54), and control circuitry 52 may configure (e.g., program) antenna elements 48 to receive and re-radiate (e.g., effectively reflect) wireless signals incident from the direction of UE device 10 towards-onto the direction of external equipment 34 (as shown by arrow 56). The antenna elements may be configured using respective beamforming coefficients. Control circuitry 52 on RIS 50 may set and adjust the adjustable devices coupled to antenna elements 48 (e.g., may set and adjust the impedances of antenna elements 48) over time to reflect wireless signals 46 incident from different selected incident angles onto different selected output angles.

To minimize the cost, complexity, and power consumption of RIS 50, RIS 50 may include only the components and control circuitry required to control and operate antenna elements 48 to reflect wireless signals 46. Such components and control circuitry may include, for example, the adjustable devices of antenna elements 48 as required to change the phase and magnitude responses of antenna elements 48 (based on corresponding beamforming coefficients) and thus the direction with which RIS 50 reflects wireless signals 46. The components may include, for example, components that adjust the impedances of antenna elements 48 so that each antenna element exhibits a respective complex reflection coefficient, which determines the phase and amplitude of the reflected (re-radiated) signal produced by each antenna element (e.g., such that the signals reflected across the array constructively and destructively interfere to form a reflected signal beam in a corresponding beam pointing direction).

All other components that would otherwise be present in UE device 10 or BS 34 may be omitted from RIS 50. For example, RIS 50 may be free from baseband circuitry (e.g., baseband circuitry 26 or 40) and/or transceiver circuitry (e.g., transceiver 42 or 28) coupled to antenna elements 48. Antenna elements 48 and RIS 50 may therefore be incapable of generating wireless data for transmission, synthesizing radio-frequency signals for transmission, and/or receiving and demodulating incident radio-frequency signals. RIS 50 may also be implemented without a display or user input device. In other words, the control circuitry on RIS 50 may adjust antenna elements 48 to direct and steer reflected wireless signals 46 without using antenna elements 48 to perform any data transmission or reception operations and without using antenna elements 48 to perform radio-frequency sensing operations. In other implementations, the RIS may include some active circuitry such as circuitry for demodulating received signals using the data RAT (e.g., to perform channel estimates for optimizing its reflection coefficients).

This may serve to minimize the hardware cost and power consumption of RIS 50. If desired, RIS 50 may also include one or more antennas (e.g., antennas separate from the antenna elements 48 used to reflect wireless signals 46) and corresponding transceiver/baseband circuitry that uses the one or more antennas to convey control signals with BS 34 or UE device 10 (e.g., using a control channel plane and control RAT). Such control signals may be used to coordinate the operation of RIS 50 in conjunction with BS 34 and/or UE device 10 but requires much lower data rates and thus much fewer processing resources and much less power than transmitting or receiving wireless signals 46. These control signals may, for example, be transmitted by UE device 10 and/or BS 34 to configure the phase and magnitude responses of antenna elements 48 (e.g., the control signals may convey beamforming coefficients). This may allow the calculation of phase and magnitude responses for antenna elements 48 to be offloaded from RIS 50, further reducing the processing resources and power required by RIS 50. In other implementations, RIS 50 may be a self-controlled RIS that includes processing circuitry for generating its own phase and magnitude responses and/or for coordinating communications among multiple UE devices (e.g., in a RIS-as-a-service configuration).

In this way, RIS 50 may help to relay wireless signals 46 between BS 34 and UE device 10 when object 31 blocks the LOS path between BS 34 and UE device 10 and/or when the propagation conditions from BS 34 to RIS 50 and from RIS 50 to UE device 10 are otherwise superior to the propagation conditions from BS 34 to UE device 10. Just a single RIS 50 may, for example, increase signal-to-interference-plus-noise ratio (SINR) for UE device 10 by as much as +20 dB and may increase effective channel rank relative to environments without an RIS. At the same time, RIS 50 may include only the processing resources and may consume only the power required to perform control procedures, minimizing the cost of RIS 50 and maximizing the flexibility with which RIS 50 can be placed within the environment.

RIS 50 may include or store a codebook (sometimes referred to herein as a RIS codebook) that maps settings for antenna elements 48 to different reflected signal beams formable by antenna elements 48 (sometimes referred to herein as RIS beams). RIS 50 may configure its own antenna elements 48 to perform beamforming with respective beamforming coefficients (e.g., as given by the RIS codebook). The beamforming performed at RIS 50 may include two concurrently active RIS beams (e.g., where each RIS beam is generated using a corresponding set of beamforming coefficients) or equivalently, a single reflected beam having an incident and output angle relative to a lateral surface of the RIS. While referred to herein as "beams," the RIS beams formed by RIS 50 do not include signals/data that are actively transmitted by RIS 50 but instead correspond to the impedance, phase, and/or magnitude response settings (e.g., reflection coefficients) for antenna elements 48 that shape the reflected signal beam of wireless signals 46 from a corresponding incident direction/angle onto a corresponding output direction/angle (e.g., one RIS beam may be effectively formed using a first set of beamforming coefficients whereas another RIS beam may be effectively formed using a second set of beamforming coefficients).

In general, RIS 50 may relay (reflect) signals between two different devices or may reflect signals transmitted by a single device back to that device. RIS 50 may form a first active RIS beam that has a beam pointing direction oriented towards the first device (sometimes referred to here as a RIS-BS beam when the first device is BS 34) and may concurrently form a second active RIS beam that has a beam pointing direction oriented towards the second device (sometimes referred to herein as a RIS-UE beam when the second device is UE device 10). In this way, when wireless signals 46 are incident from the first device (e.g., BS 34) within the first RIS beam, the antenna elements 48 on RIS 50 may receive the wireless signals incident from the direction the first device (e.g., BS 34) and may re-radiate (e.g., effectively reflect) the incident wireless signals within the second RIS beam and towards the direction of the second device (e.g., UE device 10). Conversely, when wireless signals 46 are incident from the second device (e.g., UE device 10) within the second RIS beam, the antenna elements 48 on RIS 50 may receive the wireless signals incident from the direction the second device (e.g., UE device 10) and may re-radiate (e.g., effectively reflect) the incident wireless signals within the first RIS beam and towards the direction of the first device (e.g., BS 34). If desired, the first and second RIS beams may be oriented in the same direction to reflect incident signals back in the direction the signals were received from.

Figure 2:
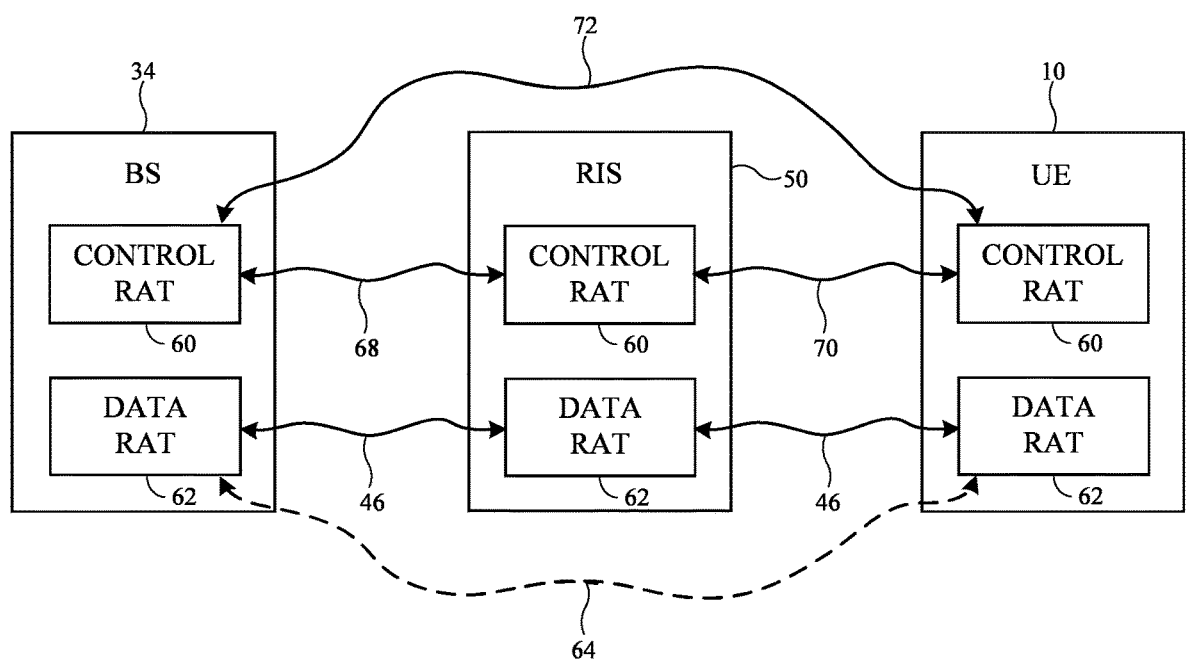
FIG. 2 is a diagram showing how an illustrative wireless base station, RIS, and UE device may communicate using both a data transfer radio access technology (RAT) and a control RAT in accordance with some embodiments.

FIG. 2 is a diagram showing how BS 34, RIS 50, and UE device 10 may communicate using both a control RAT and a data transfer RAT for establishing and maintaining communications between BS 34 and UE device 10 via RIS 50. As shown in FIG. 2, BS 34, RIS 50, and UE device 10 may each include wireless circuitry that operates according to a data transfer RAT 62 (sometimes referred to herein as data RAT 62) and a control RAT 60. Data RAT 62 may be a sub-THz communications RAT such as a 6G RAT that performs wireless communications at the frequencies of wireless signals 46. Control RAT 60 may be associated with wireless communications that consume much fewer resources and are less expensive to implement than the communications of data RAT 62. For example, control RAT 60 may be Wi-Fi, Bluetooth, a cellular telephone RAT such as a 3G, 4G, or 5G NR FR1 RAT, etc. As another example control RAT 60 may be an infrared communications RAT (e.g., where an infrared remote control or infrared emitters and sensors use infrared light to convey signals for the control RAT between UE device 10, BS 34, and/or RIS 50).

BS 34 and RIS 50 may use control RAT 60 to convey radio-frequency signals 68 (e.g., control signals) between BS 34 and RIS 50. UE device 10 and RIS 50 may use control RAT 60 to convey radio-frequency signals 70 (e.g., control signals) between UE device 10 and RIS 50. UE device 10, BS 34, and RIS 50 may use data RAT 62 to convey wireless signals 46 via reflection off antenna elements 48 of RIS 50. The wireless signals may be reflected, via the first RIS beam and the second RIS beam formed by RIS 50, between BS 34 and UE device 10. BS 34 may use radio-frequency signals 68 and control RAT 116 and/or UE device 10 may use radio-frequency signals 70 and control RAT 116 to discover RIS 50 and to configure antenna elements 48 to establish and maintain the relay of wireless signals 32 performed by antenna elements 48 using data RAT 62.

If desired, BS 34 and UE device 10 may also use control RAT 60 to convey radio-frequency signals 72 directly with each other (e.g., since the control RAT operates at lower frequencies that do not require line-of-sight). UE device 10 and BS 34 may use radio-frequency signals 72 to help establish and maintain THF communications (communications using data RAT 62) between UE device 10 and BS 34 via RIS 50. BS 34 and UE device 10 may also use data RAT 62 to convey wireless signals 46 directly (e.g., without reflection off RIS 50) when a LOS path is available.

If desired, the same control RAT 60 may be used to convey radio-frequency signals 68 between BS 34 and RIS 50 and to convey radio-frequency signals 70 between RIS 50 and UE device 10. If desired, BS 34, RIS 50, and/or UE device 10 may support multiple control RATs 60. In these scenarios, a first control RAT 60 (e.g., Bluetooth) may be used to convey radio-frequency signals 68 between BS 34 and RIS 50, a second control RAT 60 (e.g., Wi-Fi) may be used to convey radio-frequency signals 70 between RIS 50 and UE device 10, and/or a third control RAT 60 may be used to convey radio-frequency signals 72 between BS 34 and UE device 10. Processing procedures (e.g., work responsibilities) may be divided between data RAT 62 one or more control RAT 60 during discovery, initial configuration, data RAT communication between UE device 10 and BS 34 via RIS 50, and beam tracking of UE device 10.

Figure 3:
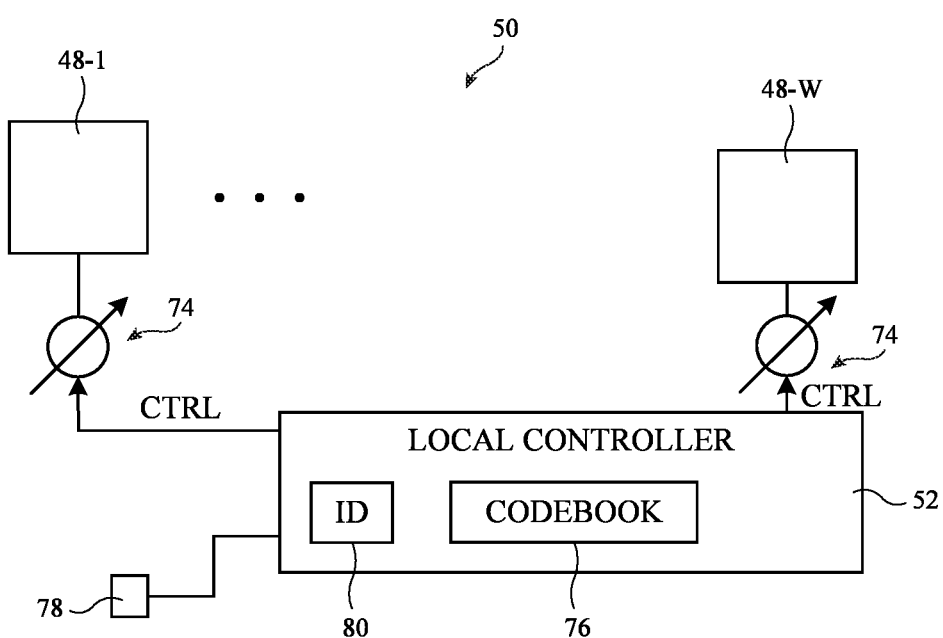
FIG. 3 is a circuit schematic diagram of an illustrative RIS in accordance with some embodiments.

FIG. 3 is a diagram of RIS 50. As shown in FIG. 3, RIS 50 may include a set of W antenna elements 48 (e.g., patches or other structures formed from metal or metamaterials/metastructures on an underlying substrate). The W antenna elements 48 may be arranged in an array pattern. The antenna elements 48 on RIS 50 may have sub-wavelength spacing and may each have a sub-wavelength width/size. The array pattern may have rows and columns. Other array patterns may be used if desired. Each antenna element 48 may be coupled to a corresponding adjustable device 74. Adjustable devices 74 may include, as one example, a diode switch. Each adjustable device 74 and its corresponding antenna element 48 may sometimes be referred to herein as a unit cell of RIS 50 (e.g., RIS 50 may have W unit cells).

Control circuitry 52 may provide respective control signals CTRL (e.g., variable voltages) to adjustable devices 74 that configure each adjustable device 74 to impart a selected impedance to its corresponding antenna element 48. The impedance may effectively impart a corresponding phase shift to incident THF signals that are scattered (e.g., re-radiated or effectively reflected) by the antenna element. Adjustable devices 74 may therefore sometimes be referred to herein as phase shifters 74. Control circuitry 52 may transmit control signals CTRL to adjustable devices 74 to control each adjustable device 74 to exhibit a corresponding phase setting and thus a corresponding reflection coefficient (beamforming coefficient). The control signal CTRL provided to each adjustable device 74 may identify, contain, carry, or otherwise represent the corresponding phase setting, reflection coefficient, or beamforming coefficient. Each phase setting (beamforming coefficient) may cause the corresponding antenna element 48 to impart a particular phase shift to the wireless signals 46 scattered (reflected) by the antenna element for data RAT 62. Put differently, each phase setting may configure the corresponding antenna element 48 to exhibit a particular reflection coefficient or impedance for incident THF signals. By selecting the appropriate settings (phase shift settings, applied phase shifts, or beamforming coefficients) for adjustable devices 74, the array of antenna elements 48 may be configured to collectively form RIS beams in different directions (e.g., to reflect/scatter wireless signals incident from incident angles associated with a first RIS beam onto corresponding output angles associated with a second RIS beam).

As shown in FIG. 3, RIS 50 may have one or more antennas 78. Antenna(s) 78 may include one or more of the W antenna elements 48 or may be separate from the W antenna elements 48 on RIS 50. Antenna(s) 78 may be coupled to a control RAT transceiver on RIS 50 and may be used to convey control signals over control RAT 60. Control circuitry 52 may transmit control signals using antenna(s) 78 and/or may receive control signals using antenna(s) 78.

Control circuitry 52 may store a codebook 76 that maps different sets of settings (e.g., phase settings) for adjustable devices 74 to different input/output angles (e.g., to different combinations of first and second RIS beams for RIS 50). Codebook 76 may be populated during manufacture, deployment, calibration, and/or regular operation of RIS 50. Codebook 76 may be stored on storage circuitry or memory on RIS 50. If desired, BS 34, UE device 10, or a dedicated controller may use control RAT 60 to populate and/or update the entries of codebook 76. During operation, RIS 50 may be controlled to configure (program) adjustable devices 74 to form the RIS beams necessary for RIS 50 to reflect wireless signals 46 between the location of BS 34 and the location of UE device 10, which may change over time. This may involve selection (calculation) of the appropriate set of phase settings (e.g., imparted phase shifts or reflection coefficients) for adjustable devices 74 to form the RIS beams.

RIS 50 may dynamically change the phase settings (reflection coefficients) of antenna elements 48 over time (e.g., to direct reflected signals in different directions to serve one or more UE devices 10). If desired, RIS 50 may be at least partially controlled by a remote controller located on an external device other than RIS 50. The remote controller may be located on an electronic device such as a BS 34, a UE device 10 (sometimes referred to herein as a controller UE device), a dedicated RIS controller, and/or other nodes of system 8 (FIG. 1). The remote controller may be distributed across multiple devices or network nodes if desired. UE devices that convey data RAT signals with BS 34 via reflection off RIS 50 may sometimes be referred to herein as served UE devices. A served UE device may be different from a controller UE device or may also be a controller UE device if desired.

Control circuitry 52 may also store identifying information about RIS 50 such as RIS identifier 80 (e.g., in storage circuitry or memory). RIS identifier 80 may include data (e.g., a string, a series of bits, symbols, etc.) that uniquely identifies RIS 50 in system 8 (e.g., RIS identifier 80 may be a globally unique identifier to RIS 50). In other implementations, the RIS identifier may be shared by two or more RIS's globally. RIS identifier 80 may be generated upon manufacture, assembly, or calibration of RIS 50 and/or may be populated by a remote controller of RIS 50 during regular operation of RIS 50 in system 8. Control circuitry 52 may also store other information about RIS 50 such as information identifying one or more capabilities of RIS 50.

It may be desirable for network nodes of system 8 (e.g., UE device 10, BS 34, etc.) to be able to detect their physical locations or positions using wireless signals 46 transmitted and received between the network nodes. Such radio-based positioning may, for example, offer greater precision than GPS-based positioning and/or may allow a network node such as UE device 10 to detect its position even when located indoors or when satellite navigation signals from a GPS satellite are not otherwise receivable. Many wireless standards such as BLE, Wi-Fi 802.11az, UWB 802.15.4.z, and 5G NR include techniques for a network node such as UE device 10 to detect its position relative to other devices/nodes in system 8. However, these wireless standards are not able to achieve position detection with sufficient precision, especially in indoor environments. This is due to the lack of clock synchronization between UE device 10 and the other nodes of the network. While some techniques such as time difference of arrival (TDoA) and round trip time (RTT) techniques can help to mitigate weak synchronization between the network nodes, these techniques can still be insufficient to produce sufficiently precise position information for the network nodes.

If desired, a node of network 8 may use wireless signals 46 that have reflected off one or more RIS's 50 to detect its physical (geographic) position (location). Utilizing RIS's 50 for position detection may allow the node to detect its position regardless of clock synchronization with other network nodes, thereby allowing the node to detect its position with greater accuracy than is supported by wireless standards such as BLE, Wi-Fi 802.11az, UWB 802.15.4.z, and 5G NR. RIS's 50 may be particularly suitable for performing range-based position detection because the RIS's do not require any precise synchronization and do not add delay that would otherwise deteriorate the measured distance (e.g., because the RIS's reflect signals without actively receiving or transmitting signals). This may also allow the initiating device (network node) to utilize any desired signal for position detection, which can be unknown to the RIS. This may serve to further optimize privacy and the security for the initiating device.

Figure 4:
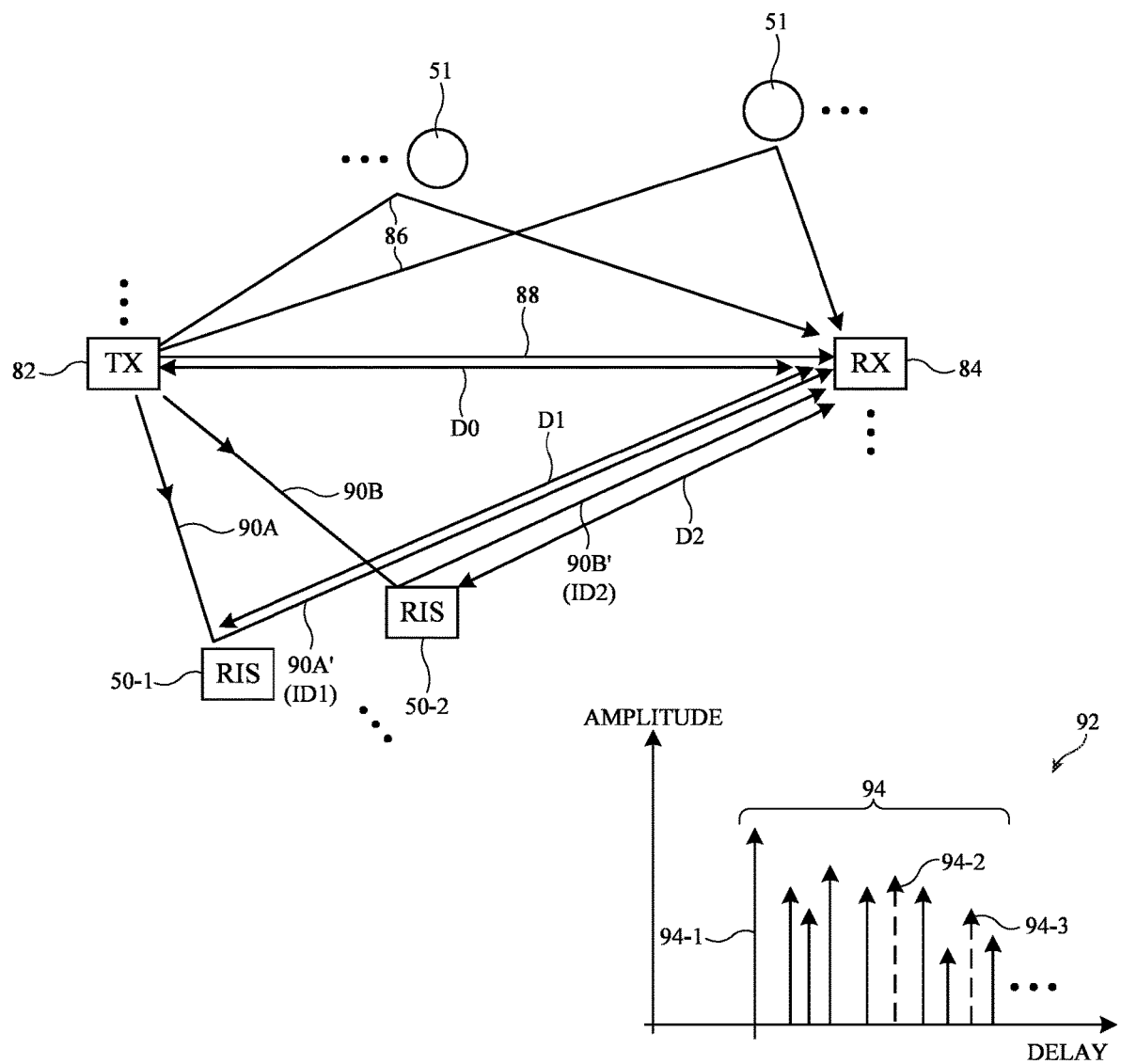
FIG. 4 is a diagram showing how illustrative RIS's may modulate device identifiers onto reflected signals to allow a receiving device to distinguish reflected signals from the RIS's from other reflected signals in accordance with some embodiments.

FIG. 4 is a diagram showing how wireless signals 46 may be reflected off of one or more RIS's 50 for performing position (location) detection. As shown in FIG. 4, system 8 may include a signal transmitting (TX) device such as TX device 82 and a signal receiving (RX) device such as RX device 84. TX device 82 may include any desired node of network 8 such as UE device 10, BS 34, etc. RX device 84 may include any desired node of network 8 such as UE device 10, BS 34, etc.

System 8 may also include a set of one or more RIS's distributed throughout the environment. For example, system 8 may include at least a first RIS 50-1 disposed at a first location in the environment and a second RIS 50-2 disposed at a second location in the environment. TX device 82 may transmit wireless signals 46 for use by RX device 84 in detecting its position within the environment. TX device 82 may transmit a wireless signal 46 into the environment within a single relatively wide (low gain) signal beam or may transmit wireless signals 46 while sweeping across a set of relatively narrow (high gain) signal beams. The transmitted wireless signal 46 may have any desired waveform (e.g., a radar waveform).

Some of the transmitted wireless signal 46 will be received at RX device 84 over the LOS path (if available), as shown by arrow 88. Some of the transmitted wireless signal 46 will also be received at RX device 84 after one or more reflections off of one or more external objects 51 in the environment, as shown by arrows 86. In addition, some of the transmitted wireless signal 46 will be received at RX device 84 after reflecting off RIS 50-1 and off RIS 50-2, as shown by arrows 90. For example, the transmitted wireless signal 46 may be incident upon RIS 50-1 (as shown by arrow 90A), which reflects the wireless signal 46 towards RX device 84 (as shown by arrow 90A') as a reflected wireless signal 46 (e.g., a reflected version of the wireless signal 46 transmitted by TX device 82). Similarly, the transmitted wireless signal 46 may be incident upon RIS 50-2 (as shown by arrow 90B), which reflects the wireless signals 90B towards RX device 84 (as shown by arrow 90B') as a reflected wireless signal 46.

RX device 84 may receive the wireless signal 46 as reflected off RIS 50-1 and RIS 50-2. RX device 84 may identify its position within the environment based at least on the wireless signals 46 reflected off RIS 50-1 and RIS 50-2 and/or the wireless signal 46 received over the LOS path. For example, RX device 84 may identify (e.g., calculate, compute, generate, output, produce, estimate, etc.) the distance D1 between RX device 84 and RIS 50-1 using the wireless signal 46 reflected off RIS 50-1 (e.g., using a time of flight (TOF) calculation). Additionally or alternatively, RX device 84 may identify the distance D2 between RX device 84 and RIS 50-2 using the wireless signal 46 reflected off RIS 50-2 (e.g., using a TOF calculation). Additionally or alternatively, RX device 84 may identify the distance D0 between RX device 84 and TX device 82 using the wireless signals 46 received over the LOS path (e.g., using a TOF calculation). RX device 84 may, for example, identify distances D1 and D2 based by first subtracting the distance between TX device 82 and RIS's 50-1 and 50-2, respectively (e.g., based on position information associated with RIS's 50-1 and 50-2 and TX device 82 prior to transmission of wireless signal 46). RX device 84 may then identify its two or three-dimensional (geographic) position within the environment based on D0, D1, and/or D2 (e.g., using a trilateration and triangulation technique, a multilateration technique, etc.). Further, if RX device 84 has information about the absolute location of TX device 82, RIS 50-1, and/or RIS 50-2 (e.g., absolute coordinates on Earth), RX device 84 may then identify its absolute position on Earth based on the absolute location of TX device 82, RIS 50-1, and/or RIS 50-2 and distances D0, D1, and/or D2.

While RX device 84 can identify the wireless signal 46 received from TX device 82 over the LOS path as the first-in-time wireless signal 46 received at RX device 84 (e.g., because the LOS path is shorter and is therefore traversed by wireless signal 46 faster than paths that reflect off of objects in the system), it can be difficult for RX device 84 to distinguish the wireless signal 46 as reflected off RIS 50-1 and RIS 50-2 (as shown by arrows 90A' and 90B) from the wireless signal 46 as reflected off of other external objects 51 (as shown by arrows 86).

Plot 92 of FIG. 4 shows an example of the channel delay profile of a given wireless signal 46 transmitted by TX device 82 and received at RX device 84 (e.g., in units of signal amplitude as a function time delay relative to transmission of the wireless signal at TX device 82). As shown by plot 92, peaks 94 represent the time delays with which RX device 84 receives a transmitted wireless signal 46. Each peak 94 corresponds to a different time delay given by the path of the wireless signal 46 in reaching RX device 92. While RX device 84 may distinguish the first-in-time peak 94-1 as being produced by the wireless signal 46 traversing the LOS path, if care is not taken, RX device 84 may be unable to distinguish the peak 94-2 corresponding to the wireless signal 46 reflected off RIS 50-1 and the peak 94-3 corresponding to the wireless signal 46 reflected off RIS 50-2 from the other peaks 94 corresponding to the wireless signal 46 reflected off external objects 51. Without knowledge of which peaks 94 correspond to reflections off RIS 50-1 and 50-2, RX device 84 is unable to identify the distances between RX device 84 and RIS's 50-1 and 50-2 and is thus unable to identify its position using wireless signal 46.

To mitigate these issues and to allow RX device 84 to distinguish the received wireless signal 46 that has reflected off RIS's 50-1 and 50-2 from the received wireless signal 46 that has reflected off external objects 51 (e.g., to distinguish peaks 94-2 and 94-3 from each other and the other peaks 94 in plot 92), each RIS 50 may configure its antenna elements 48 to modulate information onto the wireless signal 46 reflected off of itself. The modulated information may include information identifying RIS 50 such as the RIS identifier 80 (FIG. 3) of that RIS 50. For example, RIS 50-1 may control its antenna elements 48 to modulate the RIS identifier 80 for RIS 50-1 (e.g., ID1) onto the wireless signal 46 reflected off RIS 50-1 towards RX device 84 (as shown by arrow 90A'). Similarly, RIS 50-2 may control its antenna elements 48 to modulate the RIS identifier 80 for RIS 50-2 (e.g., ID2) onto the wireless signal 46 reflected off RIS 50-2 towards RX device 84 (as shown by arrow 90B').

RX device 84 may then identify the wireless signal 46 reflected off RIS 50-1 (e.g., peak 94-2) based on RIS identifier ID1 and the wireless signal 46 reflected off RIS 50-2 (e.g., peak 94-3) based on RIS identifier ID2. For example, RX device 84 may receive, demodulate, and/or decode the wireless signal 46 received at different times (delays). RX device 84 may identify the wireless signal 46 containing RIS identifier ID1 as being the wireless signal 46 reflected off RIS 50-1 and may identify the wireless signal 46 containing RIS identifier ID2 as being the wireless signal 46 reflected off RIS 50-2. RX device 84 may then use the wireless signal 46 known to have reflected off RIS 50-1 to identify distance D1 and may use the wireless signal 46 known to have reflected off RIS 50-2 to identify distance D2 (e.g., using a TOF technique). In this way, RX device 84 may detect its position relative to the RIS's 50 in system 8 even though the transmitted wireless signal 46 is also received at RX device 84 after reflecting off external objects 51 in the environment.

The control circuitry 52 on a given RIS 50 may modulate information such as its RIS identifier 80 onto the reflected wireless signal 46 by controlling each of its adjustable devices 74 or a subset of its adjustable devices 74 FIG. 3 to exhibit different respective impedances and thus reflection coefficients and/or phase shifts (e.g., phase shifts of the complex reflection coefficients of the corresponding antenna elements 48) as a function of time and/or space (e.g., position across the array of antenna elements 48). For example, control circuitry 52 may use control signals CTRL to control adjustable devices 74 to perform any desired temporal and/or spatial encoding of the reflection coefficients across the array of antenna elements 48 (e.g., that adjusts the phase of the reflection coefficients of the individual antenna elements 48) in a manner that encodes (modulates) the reflected wireless signal 46 with information such as RIS identifier 80. The phase shifts of the reflection coefficients produced by each adjustable device 74 may be adjusted/updated over time in a discrete manner (e.g., with a predetermined periodicity) or in a continuous manner to modulate RIS identifier 80 onto the reflected wireless signal 46.

This may serve to produce a multiplexing/multiple access capability that allows RX device 84 to distinguish between the wireless signal 46 reflected by each RIS 50 from each other and from the wireless signal 46 as reflected by external objects 51. The phase shifts produced by adjustable devices 74 in modulating RIS identifier 80 onto the reflected wireless signal 46 may be performed over (superimposed with) the phase shifts produced by adjustable devices 74 to produce a reflected signal beam oriented towards RX device 84 (given the incident angle of the wireless signals from TX device 82). In this way, the wireless signal 46 incident from TX device 82 will be reflected towards RX device 84 and will be concurrently modulated to include or convey RIS identifier 80. RX device 84 may process or decode (demodulate) the modulation to recover the RIS identifier 80 from the reflected wireless signal 46.

Adjusting the phase shifts of the complex reflection coefficients of antenna elements 48 to convey RIS identifier 80 in this way may also allow RIS 50 to also perform frequency shifting, phase coding, and/or on/off switching on the reflected wireless signal 46. Frequency shifting may help to create signal separation (e.g., between the wireless signal 46 reflected off a RIS 50 and the other wireless signals received at RX device 84) in the Doppler/velocity domain. Phase coding may allow for signal separation in the code domain via correlation (e.g., inner coding) and/or may allow for signal separation based on summation/subtraction (e.g., using Hadamard matrices) on a symbol-level basis (e.g., outer coding). On/off switching may allow for the comparison of two different received signal measurements at RX device 84 and an evaluation of a difference between the measurements. Additionally or alternatively, RIS 50 may encode (modulate) RIS identifier 80 onto the reflected wireless signal 46 by changing the polarization of the reflected wireless signal (e.g., from left-hand circular polarized to right-hand circular polarized, etc.). RIS 50 may use any desired combination of these schemes to modulate information such as RIS identifier 80 onto the reflected wireless signal 46 to help RX device 84 to distinguish the wireless signal 46 received over a propagation path including reflection off RIS 50 from the wireless signal 46 received over other propagation paths that may have reflected off of other external objects 51 (e.g., for detecting its position relative to the RIS and/or its absolute position).

The example of FIG. 4 is illustrative and non-limiting. If desired, TX device 82 and RX device 84 may be the same device (e.g., a single UE device 10). Such a device may both transmit wireless signal 46 and may receive the reflected wireless signal having the modulated RIS identifier from one or more RIS's for detecting its own position relative to the one or more RIS's. If desired, system 8 may include more than one TX device 82 that transmits wireless signals 46 for receipt at RX device 84 to detect its position. If desired, system 8 may include more than one RX device 84 that receives wireless signals 46 from one or more TX devices 82 for detecting their respective positions. Reflection off a single RIS 50 or more than two RIS's 50 may be used for position detection if desired.

Figure 5:
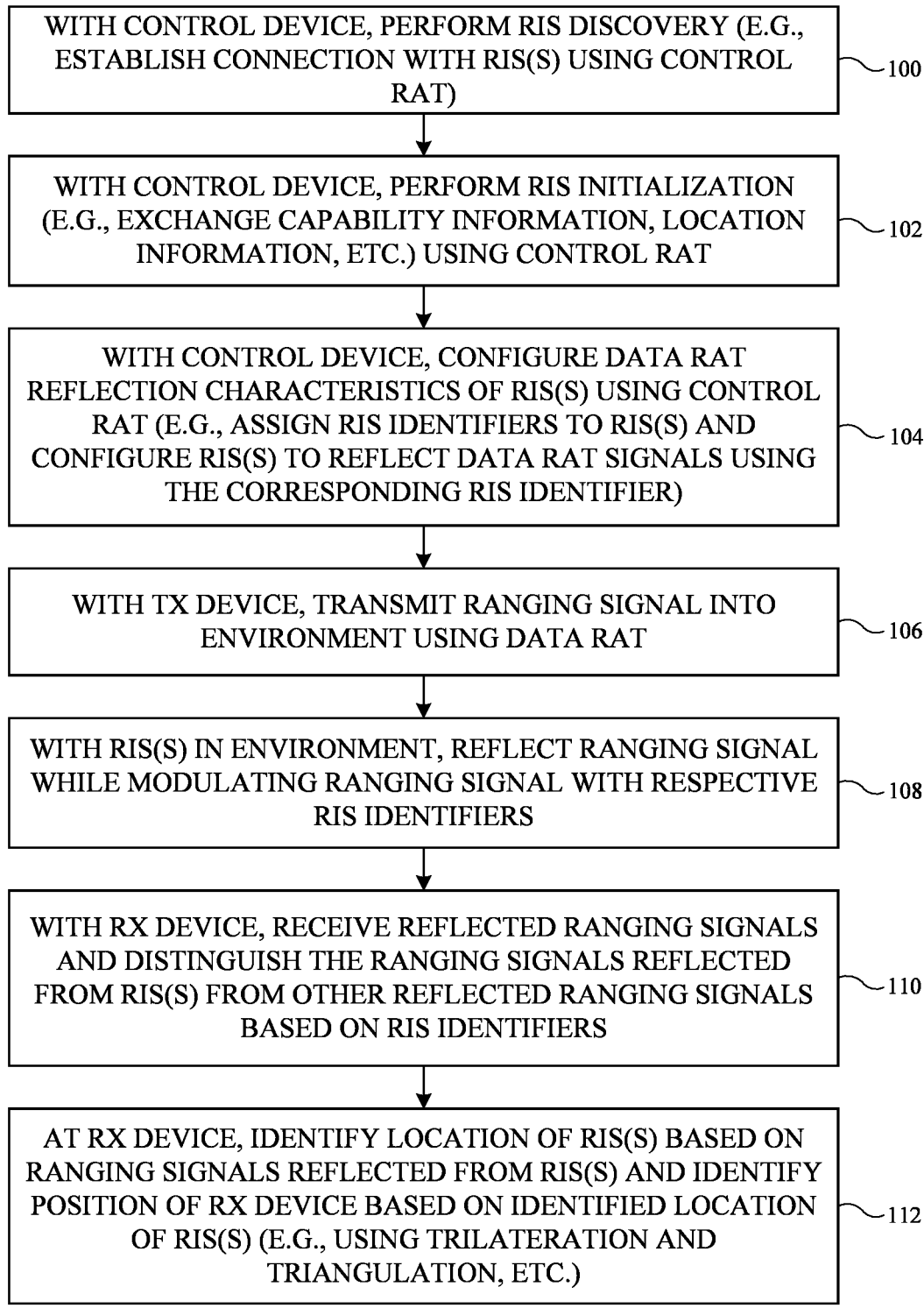
FIG. 5 is a flow chart of illustrative operations involved in detecting the position of an electronic device using radio-frequency signals reflected off one or more RIS's in accordance with some embodiments.

FIG. 5 is a flow chart of illustrative operations involved in detecting, at RX device 84, the position of the RX device based on a wireless signal 46 transmitted by TX device 82 and reflected off of one or more RIS's 50. These operations may, for example, involve transmission of as little positioning-specific signaling in wireless signals 46 as possible, thereby minimizing the impact of position detection on wireless data conveyed between the TX and RX devices.

At operation 100, a control device (controller) in system 8 may perform RIS discovery on a set of one or more RIS's 50 in system 8. The control device may perform the RIS discovery using the control RAT. The RIS discovery may serve to identify, to the control device, the presence of the RIS(s) 50 available for reflection of wireless signals 46 for use in position detection (e.g., positioning signals) and may serve to establish a control RAT connection between the control device and those RIS(s). The control device may be RX device 84 itself (e.g., a UE device 10, BS 34, or another network node), TX device 82 (e.g., a UE device 10, BS 34, or another network node), or may be another network node that is neither RX device 84 nor TX device 82 (e.g., a dedicated RIS controller).

For example, the control device may use the control RAT to discover RIS 50-1 and RIS 50-2 in system 8 (FIG. 4). This may involve using the control RAT to transmit a signal to the RIS's in system 8 and receipt of a response to the transmitted signal from the RIS's in system 8 that received the transmitted signal. Once the control device has discovered RIS 50-1 and RIS 50-2, the control device is aware of the presence of the RIS 50-1 and RIS 50-2 in the system and can use those RIS's for performing positioning.

At operation 102, the control device may perform a RIS initialization on the discovered RIS's in system 8 using the control RAT. This may involve using the control RAT to exchange capability information and/or location information between the control device and the discovered RIS's. For example, the control device may use the control RAT to request capability information and/or location information from RIS 50-1 and RIS 50-2 of FIG. 4. RIS 50-1 and RIS 50-2 may use the control RAT to transmit capability information and/or location information to the control device.

The location information may include information identifying the location/position of RIS 50 (e.g., in absolute coordinates). The capability information may include information identifying one or more capabilities of RIS 50. The capability information may include, for example, information identifying the modulation/multiplexing capabilities of the RIS, information identifying how to utilize and control the modulation/multiplexing capabilities (e.g., mechanisms for setting phase shifts of the antenna elements, channel information, etc.), information about a geometry of the RIS and/or its antenna elements 48, etc. Once the initialization is complete, the control device may have knowledge of the precise (e.g., absolute) location of each RIS as well as information identifying the modulation/multiplexing capabilities of the RIS and how to utilize and control the modulation/multiplexing capabilities.

At operation 104, the control device may configure one or more data RAT reflection characteristics of each initialized RIS (e.g., using control signals conveyed over the control RAT) based on the RIS capability information received during the RIS initialization. This may include, for example, assigning a RIS identifier 80 to each RIS and/or instructing the control circuitry 52 on the RIS on how to control its antenna elements 48 over time and/or space to modulate reflected signals 46 to include or identify its RIS identifier 80. For example, the control device may use the control RAT to provide RIS 50-1 of FIG. 4 with phase settings for each of its antenna elements 48 that are then used by RIS 50-1 to modulate reflected wireless signals 46 with its RIS identifier ID1 (e.g., based on the capability information provided by RIS 50-1 to the control device). Similarly, the control device may use the control RAT to provide RIS 50-2 of FIG. 4 with phase settings for each of its antenna elements 48 that can be used by RIS 50-2 to modulate reflected wireless signals 46 with its RIS identifier ID2 (e.g., based on the capability information provided by RIS 50-2 to the control device).

If desired, the control device may use the control RAT to control each RIS 50 to exhibit a desired amount of reflected beam focusing or defocusing in reflecting wireless signal 46 (e.g., via appropriate setting of the adjustable devices 74 on the RIS), may control each RIS 50 to reflect wireless signal 46 at desired reflection angles (e.g., via appropriate setting of the adjustable devices 74 on the RIS), and/or may control the specific modulation/multiplexing properties of the RIS, including time schedules for code modulation and/or frequency shifts for use in modulating the RIS identifier onto the reflected signals. If desired, the reflected wireless signal may be provided with a relatively defocused beam to spread the reflected energy over as wide an angle as possible to ensure that the reflected signals reach RX device 84 regardless of the location of RX device 84.

The control device may perform some or all of the configuration of the adjustable devices 74 on each RIS 50 to configure the RIS 50 to reflect wireless signals 46 with the desired characteristics and modulated with the corresponding RIS identifier 80. For example, the control device may directly generate/define each reflection coefficient (e.g., phase shift) for each antenna element 48 and the corresponding settings for the adjustable devices 74 for each antenna element 48 on RIS 50. The control device may then use the control RAT to program each of the adjustable devices 74 on RIS 50 to implement the generated reflection coefficients. As another example, the control device may generate parameterized commands that instruct control circuitry 52 on RIS 50 to locally calculate the reflection coefficients (e.g., phase shifts) for each antenna 48 and the corresponding setting for the adjustable devices 74 for each antenna element 48 on RIS 50. The control device may use the control RAT to transmit the parameterized commands to RIS 50. More generally, any desired work split may be used to divide the generation of settings for the adjustable devices 74 on RIS 50 between control circuitry 52 on RIS 50 and the control device. If desired, the control device may achieve separation between multiple RIS's 50 in system 8 using different modulation parameterizations for different RIS's. For example, the control device may control different RIS's to implement different frequency shifts and/or phase codes in reflecting wireless signals 46 to allow RX device 84 to more easily distinguish between signals reflected by different RIS's.

At operation 106, TX device 82 may transmit a wireless signal 46 (sometimes referred to herein as a ranging signal) into the environment over the data RAT. The ranging signal may have any desired waveform. For example, wireless signal 46 may be a dedicated signal for performing position detection or spatial ranging (e.g., a radar waveform), may convey wireless data (e.g., a stream of wireless data packets that have corresponding data payloads), or may be another waveform (e.g., a reference signal waveform, a synchronization signal waveform, etc.). TX device 82 may transmit wireless signal 46 within a single relatively wide beam or may transmit wireless signal 46 while sweeping over different relatively narrow beams. The transmitted wireless signal 46 may pass to RX device 84 over the LOS path and/or may reflect off objects in the environment such as external objects 51 and RIS(s) 50.

At operation 108, each RIS 50 (e.g., each RIS as discovered at operation 100, initialized at operation 102, and configured at operation 104) may reflect the wireless signal 46 incident from TX device 82. Each RIS 50 may reflect the incident wireless signal 46 in a corresponding (focused) reflected signal beam oriented towards RX 84 and/or may reflect the incident wireless signal in a relatively wide (defocused) reflected signal beam (e.g., as configured by the control device). Each RIS 50 may modulate its corresponding RIS identifier 80 onto the wireless signal 46 reflected by that RIS (e.g., using the multiplexing/modulation/coding scheme as configured by the control device).

At operation 110, RX device 84 may begin receiving the wireless signal 46 transmitted by TX device 82. For example, RX device 84 may receive the wireless signal 46 over the LOS path and may receive the wireless signal 46 as reflected off objects in the environment. The reflected signals may include the wireless signal 46 as reflected off each of the configured RIS's 50 and modulated by the configured RIS's 50 with their corresponding RIS identifiers 80. RX device 84 may process each of the received wireless signals 46. RX device 84 may detect (e.g., via demodulation, decoding, etc.) the RIS identifiers 80 in the received wireless signals 46. RX device 84 may use the detected RIS identifiers 80 to distinguish the wireless signal 46 received from a propagation path including reflection off RIS's 50 from each other and from the wireless signal 46 received from propagation paths including reflection off external objects 51. For example, RX device 84 may process the received wireless signals to identify (e.g., detect) that the received wireless signal associated with peak 94-2 in plot 92 of FIG. 4 was reflected off RIS 50-1 and that the received wireless signal associated with peak 94-3 in plot 92 of FIG. 4 was reflected off RIS 50-2.

At operation 112, RX device 84 may identify the relative location between RX device 84 and each of the RIS's 50 that reflected wireless signal 46 towards RX device 84 based on the TOF of the received wireless signals 46 that were modulated using RIS identifiers 80 (e.g., based on the time delay of the received wireless signals 46 that were detected as being modulated using RIS identifiers 80). For example, RX device 84 may identify a first TOF of the wireless signal 46 reflected from RIS 50-1 based on the time delay of the received wireless signal 46 that was modulated using the corresponding RIS identifier ID1 (e.g., based on the time delay of peak 94-2 of plot 92 in FIG. 4). RX device 84 may then identify distance D1 between RX device 84 and RIS 50-1 based on the first TOF. Similarly, RX device 84 may identify a second TOF of the wireless signal 46 reflected from RIS 50-2 based on the time delay of the received wireless signal 46 that was modulated using the corresponding RIS identifier ID2 (e.g., based on the time delay of peak 94-3 of plot 92 in FIG. 4). RX device 84 may then identify distance D2 between RX device 84 and RIS 50-1 based on the first TOF. If desired, RX device 84 also identify the LOS distance D0 between RX device 84 and TX device 82 based on the wireless signal 46 received over the LOS path (e.g., based on the TOF of the first-in-time peak 94-1 of plot 92 of FIG. 4).

Once RX device 84 has identified its relative location (position), RX device 84 may provide an output to a user identifying the relative location (e.g., a visual, haptic, and/or audio alert or message) and/or may provide the relative location as an input to one or more software applications running on RX device 84. The location (position) of RX device 84 may include a translational position (e.g., in two-dimensional or three-dimensional coordinates of RX device 84) and/or a rotational orientation/position (e.g., about one or more rotational axes). RX device 84 may identify its orientation based on angle of arrival (AoA) information from the received wireless signals and one or more of the translational coordinates of the RX device, for example.

If desired, RX device 84 may then identify its absolute location (position) based on its relative location and based on the known absolute position of one or more of the RIS's 50 that reflected wireless signals 46 and/or the known absolute position of TX device 82 (e.g., as identified by the location information identified at operation 102). In implementations where RX device 84 is not the control device, the control device may use the control RAT or the data RAT to transmit the location information to RX device 84. For example, RX device 84 may identify its absolute position (coordinates) on Earth by combining its detected position relative to a given RIS 50 with the known absolute position of that RIS 50 as identified in the location information received from the RIS. Once RX device 84 has identified its absolute location (position), RX device 84 may provide an output to a user identifying the absolute location (e.g., a visual, haptic, and/or audio alert or message) and/or may provide the absolute location as an input to one or more software applications running on RX device 84.

Figure 6:
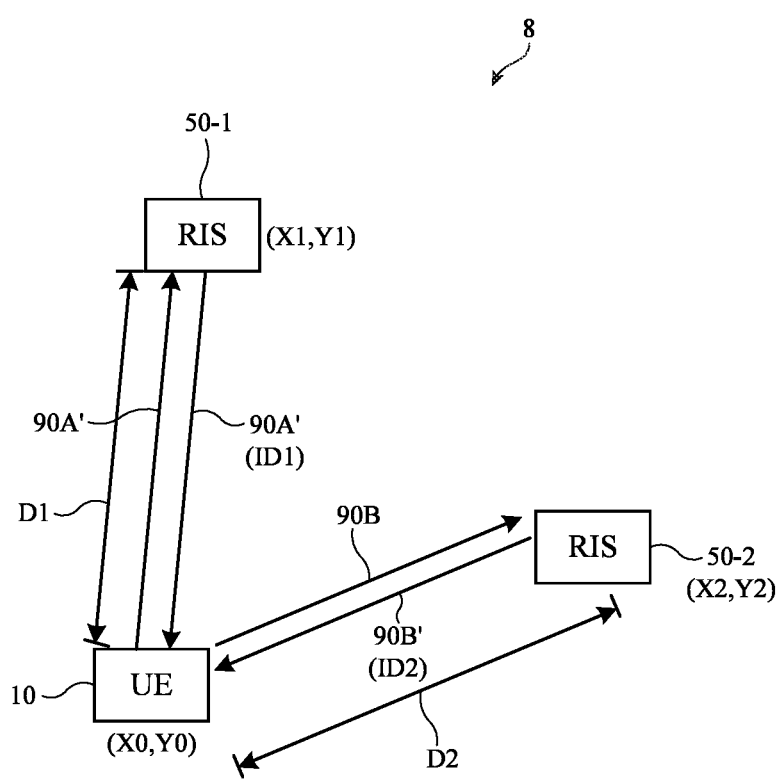
FIG. 6 is a diagram showing how an illustrative user equipment device may detect its own position using radio-frequency signals reflected off of multiple RIS's in accordance with some embodiments.

The example of FIG. 5 is illustrative and non-limiting. In general, other control schemes may be used to coordinate position detection at RX device 84. A given RX device 84 may also be used as a TX device 82 and vice versa if desired. FIG. 6 is a diagram showing one example of how the same network node (e.g., UE device 10) may detect its own position (e.g., in an implementation where TX device 82 and RX device 84 are the same device). In these situations, UE device 10 needs to reflect a wireless signal 46 off of two or more RIS's 50 in order to triangulate its location. If only a single RIS 50 were used, UE device 10 would only be able to identify a spatial circle centered on the RIS in which the UE device lies.

As shown in FIG. 6, UE device 10 may be located at a first absolute position on Earth (e.g., at absolute coordinates (X0, Y0), which may correspond to latitude and longitude values or other coordinates). System 8 may include a first RIS 50-1 at a second absolute position (X1, Y1) that is separated from the first absolute position by distance D1. System 8 may also include a second RIS 50-2 at a third absolute position (X2, Y2) that is separated from the first absolute position by distance D2. The second absolute position (X1, Y1) may be known to RIS 50-1 (e.g., as determined using sensor data, satellite navigation data, during deployment of RIS 50-1 by an operator or administrator, as provided to RIS 50-1 by another device, etc.). The third absolute position (X2, Y2) may be known to RIS 50-2 (e.g., as determined using sensor data, satellite navigation data, during deployment of RIS 50-2 by an operator or administrator, as provided to RIS 50-2 by another device, etc.). Each of absolute positions (X0,Y0), (X1,Y1), and (X2,Y2), distance D1, and distance D2 may be unknown to UE device 10 prior to performing position detection (e.g., prior to performing the operations of FIG. 5). UE device 10 may perform position detection (e.g., the operations of FIG. 5) to detect distance D1, distance D2, and/or its own absolute position (X0, Y0).

When performing position detection, UE device 10 may first use the control RAT to discover RIS 50-1 and RIS 50-2 in system 8 (e.g., while processing operation 100 of FIG. 5). Alternatively, another control device may discover the RIS's and may use the control RAT or the data RAT to provide the corresponding information to UE device 10. UE device 10 may then receive capability information and location information from RIS 50-1 and RIS 50-2 using the control RAT (e.g., while processing operation 102 of FIG. 5). Alternatively, another control device may receive the capability and location information and may use the control RAT or the data RAT to provide the capability and location information to UE device 10. UE device 10 may thereby have knowledge of the absolute position (X1,Y1) of RIS 50-1 and/or the absolute position (X2,Y2) of RIS 50-2 (from the received location information). UE device 10 may then use the control RAT to configure RIS 50-1 to reflect wireless signals 46 modulated using its RIS identifier ID1 and may use the control RAT to configure RIS 50-2 to reflect wireless signals 46 modulated using its RIS identifier ID2 (e.g., while processing operation 104 of FIG. 5). Alternatively, another control device may use the control RAT to configure RIS 50-1 to reflect wireless signals 46 modulated using its RIS identifier ID1 and may use the control RAT to configure RIS 50-2 to reflect wireless signals 46 modulated using its RIS identifier ID2.

Once RIS 50-1 and RIS 50-2 have been configured, UE device 10 may transmit a wireless signal 46 (e.g., at operation 106 of FIG. 5). Wireless signal 46 may propagate towards RIS 50-1, as shown by arrow 90A. Wireless signal 46 may also concurrently propagate towards RIS 50-2, as shown by arrow 90B. RIS 50-1 may reflect the incident wireless signal 46. RIS 50-2 may concurrently reflect the incident wireless signal 46 (e.g., at operation 108 of FIG. 5). RIS 50-1 may modulate its RIS identifier ID1 onto the wireless signal 46 reflected by RIS 50-1. RIS 50-2 may concurrently modulate its RIS identifier ID2 onto the wireless signal 46 reflected by RIS 50-2. The reflected wireless signal 46 modulated with (using) RIS identifier ID1 may propagate back towards UE device 10, as shown by arrow 90A'. The reflected wireless signal 46 modulated with (using) RIS identifier ID2 may concurrently propagate back towards UE device 10, as shown by arrow 90B'.

UE device 10 may receive the wireless signal 46 reflected off RIS 50-1 and modulated using RIS identifier ID1 from RIS 50-1 and may receive the wireless signal 46 reflected off RIS 50-2 and modulated using RIS identifier ID2 from RIS

50-2. UE device 10 may detect the RIS identifier ID1 modulated onto the wireless signal reflected off RIS 50-1 to distinguish the wireless signal reflected off RIS 50-1 from the wireless signal reflected off RIS 50-2 and the wireless signal reflected from other external objects (e.g., at operation 110 of FIG. 5). UE device 10 may also detect the RIS identifier ID2 modulated onto the wireless signal reflected off RIS 50-2 to distinguish the wireless signal reflected off RIS 50-2 from the wireless signal reflected off RIS 50-1 and the wireless signal reflected from other external objects.

UE device 10 may then identify the TOF of the wireless signal 46 reflected off RIS 50-1 from the time delay between transmission of wireless signal 46 and reception of the reflected wireless signal 46 modulated using RIS identifier ID1. UE device 10 may identify distance D1 between UE device 10 (absolute position (X0, Y0)) and RIS 50-1 (absolute position (X1,Y1)) based on the TOF (e.g., given the known propagation speed of wireless signals 46). Using only this information, UE device 10 may identify that UE device 10 is located on a circle centered at RIS 50-1 and having a radius equal to distance D1.

If desired, UE device 10 also identify the TOF of the wireless signal 46 reflected off RIS 50-2 from the time delay between transmission of wireless signal 46 and reception of the reflected wireless signal 46 modulated using RIS identifier ID2. UE device 10 may identify distance D2 between UE device 10 (absolute position (X0, Y0)) and RIS 50-2 (absolute position (X2, Y2)) based on the TOF. Using only this information, UE device 10 may identify that UE device 10 is located on a circle centered at RIS 50-2 and having a radius equal to distance D2. UE device 10 may combine the detected distance D1 with the detected distance D2 to identify the location of UE device 10 relative to RIS 50-1 and RIS 50-2. For example, UE device 10 may identify its relative location as the intersection of the circle of radius D1 centered on RIS 50-1 and the circle of radius D2 centered on RIS 50-2. As the two circles may intersect at two points, UE device 10 may identify the AoA of the wireless signals reflected off RIS 50-1 and/or RIS 50-2 or may reflect wireless signal 46 off one or more additional RIS's 50 to resolve the ambiguity. UE device 10 may also identify its relative orientation based on the AoA. This example is illustrative and non-limiting. In general, UE device 10 may use any desired triangulation or multilateration scheme to detect its relative location. If desired, wireless signal 46 may be reflected off more than two RIS's 50 and more complex localization techniques may be used to identify the location of RX device 84. The relative and absolute positions may be defined in three or more dimensions if desired (e.g., three spatial dimensions and one or more rotational/orientation dimensions or using any other desired coordinate system).

Once UE device 10 has knowledge of its relative location, UE device 10 may combine the relative location with the absolute position (X1,Y1) of RIS 50-1 and/or the absolute position (X2, Y2) of RIS 50-2 to identify its own absolute position (X0, Y0) on Earth. In this way, UE device 10 may use wireless signals 46 to precisely detect its location without requiring clock synchronization with any other devices. UE device 10 may repeat this procedure over time to continue to detect/update its location as the UE device 10 moves around the environment.

In the example of FIG. 6, UE device 10 forms both RX device 84 and TX device 82 of FIG. 4. This may implicitly remove clock synchronization requirements because the same clocking circuitry (on UE device 10) is used to both transmit and receive wireless signals 46. When RX device 84 and TX device 82 are different devices, synchronization error exists between RX device 84 and TX device 82 (e.g., as an offset between the clocking circuitry on RX device 84 and the clocking circuitry on TX device 82). Clock jitter may also be present in one or both devices but may be negligible due to the short duration of measurement and a smoothing effect that occurs due to the coherent processing. In examples where RX device 84 and TX device 82 are different devices, one of the devices may be mobile whereas the other device is stationary (or has precise knowledge of its position). Either RX device 84 or TX device 82 may be the stationary device. Implementations in which TX device 82 is the stationary device may offer greater privacy than when RX device 84 is the stationary device, as the mobile device may calculate its own location without exposing this information to the stationary device.

Figure 7:
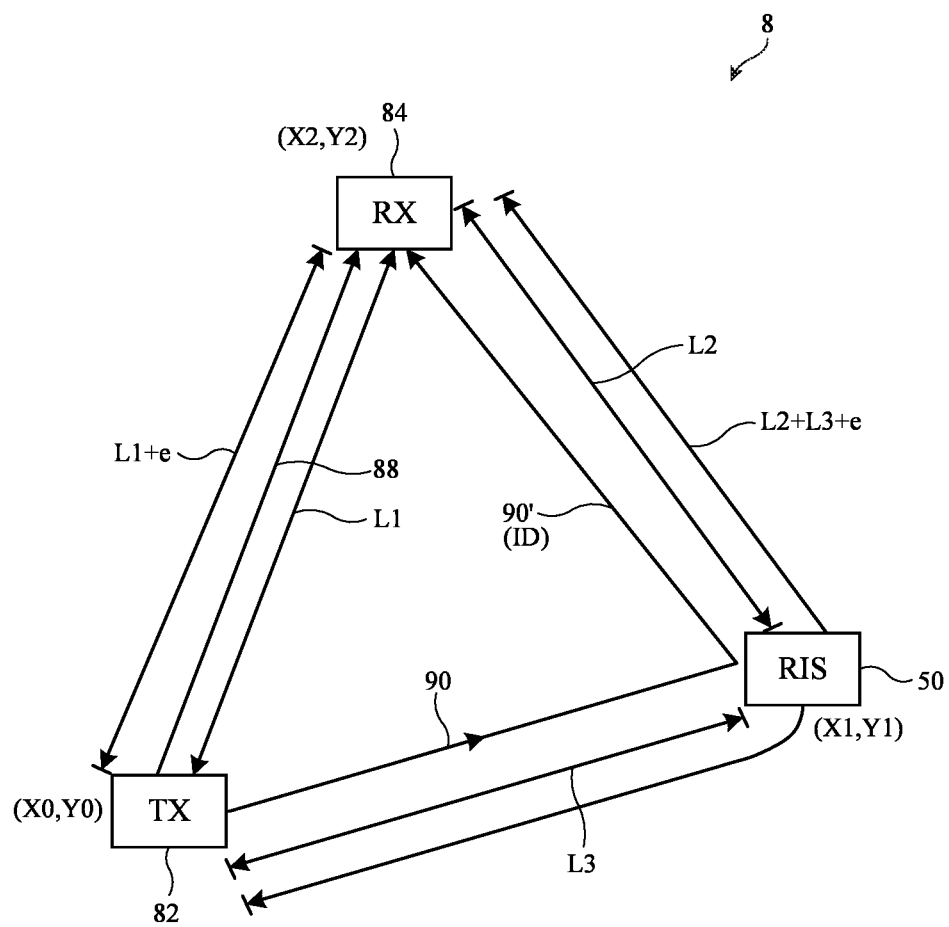
FIG. 7 is a diagram showing how an illustrative receiving device may receive radio-frequency signals transmitted by a transmitting device and reflected off a RIS for detecting the position of the receiving device in accordance with some embodiments.

FIG. 7 is a diagram showing one such example in which mobile RX device 84 (e.g., UE device 10) may detect its own position based on a wireless signal 46 transmitted by a stationary TX device 82 (e.g., BS 34, a stationary UE device 10, etc.). As shown in FIG. 7, TX device 82 may be located at absolute position (X0, Y0), a RIS 50 may be located at absolute position (X1,Y1), and RX device 84 may be located at absolute position (X2, Y2). RX device 84 may be located at a true distance L1 from TX device 82. TX device 82 may be located at a true distance L3 from RIS 50. RIS 50 may be located at a true distance L2 from RX device 84. RX device 84 may have no knowledge of absolute positions (X0, Y0) and (X1,Y1) and true distances L1, L2, and L3 prior to performing position detection.

When performing position detection, RX device 84 may first use the control RAT to discover RIS 50 and TX device 82 in system 8 (e.g., while processing operation 100 of FIG. 5). RX device 84 may then receive capability information and location information from RIS 50 and optionally TX device 82 over the control RAT (e.g., while processing operation 102 of FIG. 5). RX device 84 may thereby have knowledge of the absolute position (X1,Y1) of RIS 50 and the absolute position (X0, Y0) of TX device 82. RX device 84 (or another control device) may then use the control RAT to configure RIS 50 to reflect wireless signal 46 modulated using its RIS identifier ID1 (e.g., while processing operation 104 of FIG. 5).

Once RIS 50 has been configured, TX device 82 may transmit a wireless signal 46 (e.g., at operation 106 of FIG. 5). Wireless signal 46 may propagate towards RIS 50, as shown by arrow 90. Wireless signal 46 may also concurrently propagate towards RX device 84 over the LOS path, as shown by arrow 88. RIS 50 may reflect the incident wireless signal 46. RIS 50 may modulate its RIS identifier ID1 onto the wireless signal 46 reflected by RIS 50. The reflected wireless signal 46 modulated with (using) RIS identifier ID1 may propagate towards RX device 84, as shown by arrow 90'.

RX device 84 may receive the wireless signal 46 reflected off RIS 50 and modulated using RIS identifier ID1 from RIS 50. RX device 84 may also receive the wireless signal 46 that propagated over the LOS path 2. RX device 84 may detect the RIS identifier ID1 modulated onto the wireless signal reflected off RIS 50 to distinguish the wireless signal reflected off RIS 50 from wireless signal reflected from other external objects (e.g., at operation 110 of FIG. 5).

RX device 84 may identify the TOF of the wireless signal 46 received over the LOS path from the time delay between transmission of wireless signal 46 and reception of the transmitted signal at RX device 84. If desired, the transmitted wireless signal 46 may include a time stamp or other information/timing from which RX device 84 is able to identify when the wireless signal was transmitted. Alternatively, TX device 82 may use the control RAT to inform RX device 84 of when the wireless signal was transmitted (e.g., in a transmission schedule for TX device 82). RX device 84 may also identify the TOF of the wireless signal 46 reflected off RIS 50 from the time delay between transmission of wireless signal 46 and reception of the reflected wireless signal 46 modulated using RIS identifier ID1.

However, since the clocking circuitry of RX device 84 is not perfectly synchronized to the clocking circuitry of TX device 82, there is an offset between the time when TX device 82 begins transmitting and the time RX device 84 begins measuring. This translates to an error e in the distances measured by RX device 10 based on the received wireless signals. For example, RX device 84 may measure the distance between TX device 82 and RX device 84 over the LOS path as L1+e instead of true distance L1 and may measure the distance between TX device 82 via RIS 50 as L2+L3+e instead of true distance L2+L3. Since error e is determined by the timing relation between TX device 82 and RX device 84, error e is independent of whether wireless signals 46 propagated to RX device 84 over the LOS path or via RIS 50. Given that the absolute locations of TX device 82 and RIS 50 are known to RX device 84 at initialization, RX device 84 may perform a bilateration operation to identify its position.

Figure 8:
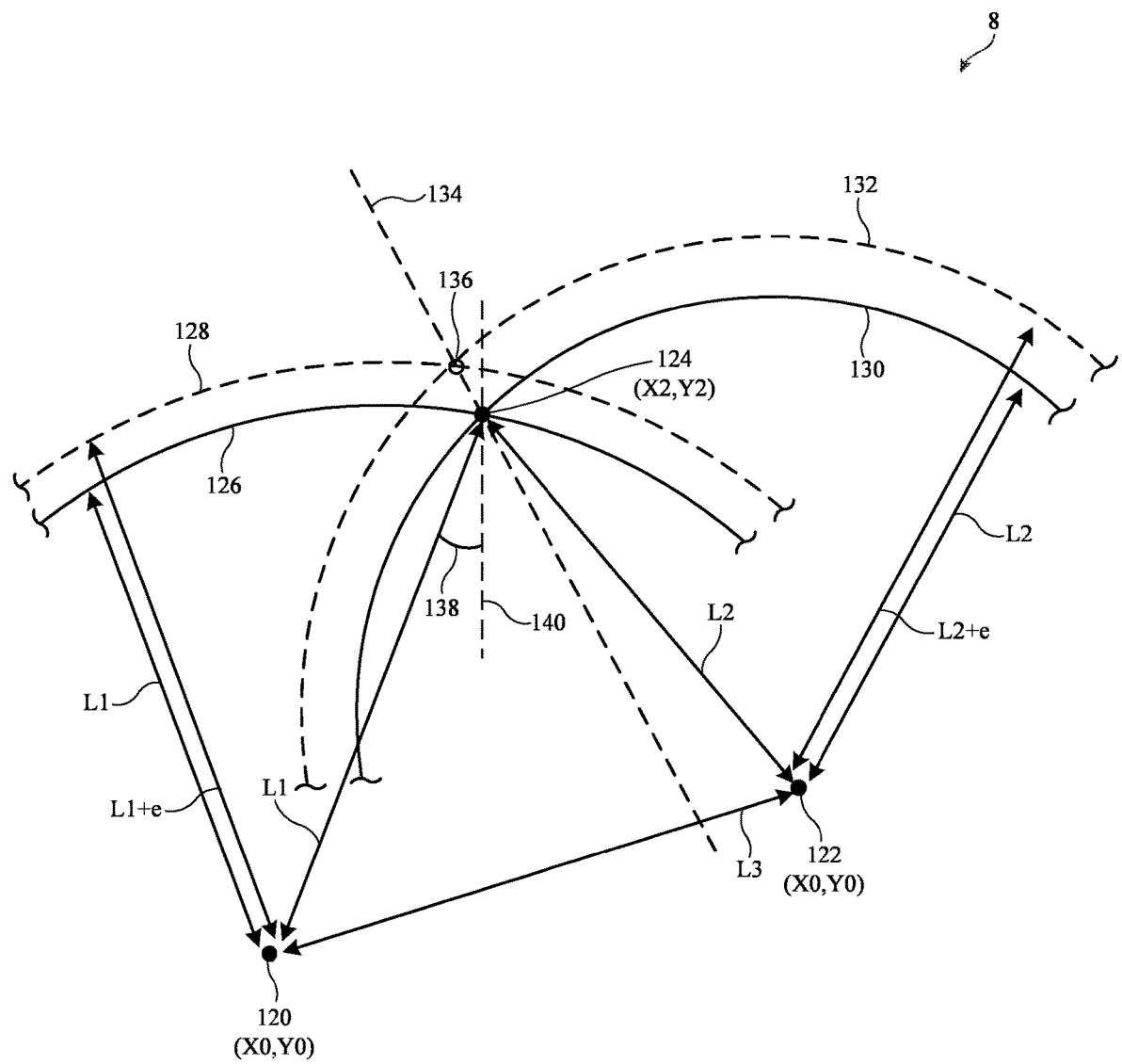
FIG. 8 is a diagram showing one example of how an illustrative receiving device may detect its position based on radio-frequency signals transmitted by a transmitting device and reflected off a RIS in accordance with some embodiments.

FIG. 8 is a diagram showing one example of how RX device 84 may perform a bilateration procedure to identify its position. As shown in FIG. 8, TX device 82 may be located at point 120 having absolute position (X0, Y0), RIS 50 may be located at point 122 having absolute position (X1,Y1), and RX device 84 may be located at point 124 having absolute position (X2, Y2). RX device 84 may have knowledge of absolute position (X0,Y0) and absolute position (X1,Y1) from the initialization procedure (e.g., at operation 102 of FIG. 5). RX device 84 may also have knowledge of distance L3 and the relative position between TX device 82 and RIS 50 (e.g., by computing the distance between known absolute positions (X0,Y0) and (X1,Y1)). Since RX device 84 has knowledge of distance L3, RX device 84 may subtract distance L3 from the measured TOF-based distance of the path from TX device 82 to RX device 84 via RIS 50 to obtain the distance between RX device 84 and RIS 50 alone (e.g., measured distance L2+e).

In the absence of error e, RX device 84 would determine, based on the TOF of the wireless signals 46 transmitted over the LOS path and via reflection off RIS 50, that RX device 84 is located at the point of intersection between a circle 126 centered at point 120 with radius L1 and a circle centered at point 122 with radius L2 (i.e., at point 124). However, the presence of error e will cause RX device 84 to instead determine that RX device 84 is located at the point of intersection between a measured circle 128 centered at point 120 with radius L1+e and a measured circle 132 centered at point 122 with radius L2+e (i.e., at point 136, which is not the true location of RX device 84).

However, while point 136 represents the incorrect location of RX device 84, the correct location of RX device 84 will lie on a line 134 extending between points 124 and 136. Line 134 represents all possible locations of RX device 84 under different possible magnitudes of e, since different potential magnitudes of e will produce circles of different sizes centered on points 120 and 122 and intersecting at different points along line 134. Line 134 also lies on the median of the triangle formed by true distances L1, L2, and L3. RX device 84 may therefore identify (e.g., calculate, generate, produce, etc.) line 134 from known distance L3 and measured distances L1+e and L2+e.

To identify the precise point along line 134 at which RX device 84 is located, RX device 84 may identify the AoA 138 of the wireless signals 46 received over the LOS path from TX device 82. For example, RX device 84 may receive wireless signals 46 using two or more antennas or arrays that are separated on RX device 84 by a known distance, may identify the phases of the wireless signals received by the two or more antennas or arrays, and may identify the AoA 138 using geometric calculations based on the known distance separating the antennas or arrays, the identified phases, and the known propagation speed of wireless signals 46. RX device 84 may then identify an additional line 140 of potential solutions for its location based on the identified AoA 138. RX device 84 may identify its true location as the intersection of lines 140 and 134 (at point 124). In this way, RX device 84 may identify its true and precise location regardless of synchronization with TX device 82.

RX device 84 may perform any desired operations based on its detected precise location. For example, RX device 84 may use its detected location to perform beamforming or beam tracking operations as the RX device moves over time (e.g., to point its data RAT signal beams towards the exact location of other network nodes or RIS's without having to perform resource and time-intensive beam sweeps each time the RX device moves), to detect the location of other objects, to provide navigation instructions to a user of the device, etc.

The example of FIGS. 7 and 8 is illustrative and non-limiting. If desired, system 8 may include more than one RIS 50 and each RIS may reflect wireless signals towards RX device 84 to allow RX device 84 to identify additional lines of possible locations (e.g., where RX device 84 may identify its precise position from the intersection of the lines). In the example of FIGS. 7 and 8, RX device 84 is mobile and TX device 82 is stationary. An equivalent complementary procedure may be used when RX device 84 is stationary and TX device 82 is mobile.

UE device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-8 may be performed by the components of UE device 10, RIS 50, and/or BS 34 using software, firmware, and/or hardware (e.g., dedicated circuitry or hardware). Software code for performing these operations may be stored on non-transitory computer readable storage media (e.g., tangible computer readable storage media) stored on one or more of the components of UE device 10, RIS 50, and/or BS 34. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of UE device 10, RIS 50, and/or BS 34. The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A method of operating an electronic device, the method comprising:
   receiving, at one or more antennas, a wireless signal reflected by a reconfigurable intelligent surface (RIS), wherein the wireless signal being is modulated using an identifier upon reflection by the RIS and is conveyed using a first radio access technology (RAT);
   detecting, at one or more processors, a location of the electronic device based on the wireless signal reflected by the RIS; and
   transmitting, using a transmitter and a second RAT different from the first RAT, a signal to the RIS that configures the RIS to modulate the identifier onto the wireless signal upon reflection by the RIS.

2. The method of claim 1, further comprising:
   transmitting the wireless signal using an additional transmitter on the electronic device.

3. The method of claim 1, wherein the wireless signal is transmitted by an additional electronic device that is separated from the electronic device.

4. The method of claim 3, wherein the electronic device is a user equipment device and the additional electronic device is a wireless base station.

5. The method of claim 3, further comprising:
   receiving, at the one or more antennas, the wireless signal from the additional electronic device over a line-of-sight path.

6. The method of claim 5, further comprising:
   receiving, at a receiver, an additional signal from the RIS identifying a position of the RIS.

7. The method of claim 6, wherein detecting the location of the electronic device comprises:
   detecting a first distance between the electronic device and the additional electronic device based on a time-of-flight (TOF) of the wireless signal received over the line-of-sight path;
   detecting a second distance between the electronic device and the additional electronic device based on a TOF of the wireless signal reflected by the RIS; and
   detecting the location of the electronic device based on the first distance, the second distance, and the position of the RIS.

8. The method of claim 1, wherein the signal further configures the RIS to perform a frequency shift, a phase coding, or an on/off switching upon reflection of the wireless signal.

9. The method of claim 1, further comprising:
   receiving, at the one or more antennas, the wireless signal as reflected by an additional RIS that is separated from the RIS, the wireless signal being modulated by the additional RIS with an additional identifier upon reflection by the additional RIS, the identifier being unique to the RIS, and the additional identifier being unique to the additional RIS.

10. The method of claim 9, further comprising:
    receiving, at a receiver and using the second RAT, a first signal from the RIS identifying a position of the RIS; and
    receiving, at the receiver and using the second RAT, a second signal from the RIS identifying a position of the additional RIS, wherein detecting the location of the electronic device comprises detecting the location of the electronic device based on the wireless signal as reflected by the additional RIS, the position of the RIS, and the position of the additional RIS.

11. The method of claim 9, further comprising:
    transmitting the wireless signal using an additional transmitter on the electronic device.

12. The method of claim 1, wherein the wireless signal is received at a first frequency greater than 10 GHz and the signal is transmitted at a second frequency less than 10 GHz.

13. An electronic device comprising:
    an array of antennas configured to receive a wireless signal over multiple propagation paths using a first radio access technology (RAT);
    a receiver configured to receive, using a second RAT different from the first RAT, a signal from a reconfigurable intelligent surface (RIS) that identifies a position of the RIS; and
    one or more processors communicatively coupled to the array of antennas, the one or more processors being configured to
    distinguish, based on information modulated onto the wireless signal by the RIS, the wireless signal as received over a propagation path that includes a reflection off the RIS from the wireless signal as received over other propagation paths of the multiple propagation paths, and
    detect, based on the wireless signal as received over the propagation path that includes the reflection off the RIS and based on the position of the RIS, a position of the electronic device.

14. The electronic device of claim 13, wherein the one or more processors is further configured to:
    distinguish, based on information modulated onto the wireless signal by an additional RIS, the wireless signal as received over an additional propagation path that includes a reflection off the additional RIS from the wireless signal as received over the other propagation paths of the multiple propagation paths, and
    detect, based on the wireless signal as received over the additional propagation path that includes the reflection off the additional RIS, the position of the electronic device.

15. The electronic device of claim 14, further comprising:
    a transmitter configured to transmit the wireless signal towards the RIS and the additional RIS.

16. The electronic device of claim 14, wherein the information modulated onto the wireless signal by the RIS comprises a first identifier unique to the RIS and the information modulated onto the wireless signal by the additional RIS comprises a second identifier unique to the additional RIS.

17. The electronic device of claim 13, further comprising:
    a transmitter configured to transmit a control signal to the RIS that programs the RIS to modulate the information onto the wireless signal upon reflection of the wireless signal by the RIS, the control signal being transmitted by the transmitter using the second RAT.

18. A method of operating a reconfigurable intelligent surface (RIS), the method comprising:
    reflecting, at an array of antenna elements, a wireless signal incident upon the RIS, wherein the wireless signal is conveyed using a first radio access technology (RAT);
    modulating, using adjustable devices coupled to the array of antenna elements, an identifier of the RIS onto the wireless signal upon reflection of the wireless signal by the array of antenna elements; and receiving, at a receiver and using a second RAT that is different from the first RAT, a control signal from an electronic device, wherein modulating the identifier onto the wireless signal comprises modulating the identifier onto the wireless signal based on the control signal.

19. The method of claim 18, wherein modulating the identifier onto the wireless signal comprises adjusting phases of complex reflection coefficients of the antenna elements in the array of antenna elements over time while the array of antenna elements reflects the wireless signal.

20. The method of claim 18, wherein the electronic device comprises a user equipment device or a wireless access point.

* * * * *